(12) United States Patent
Fan et al.

(10) Patent No.: US 12,167,454 B2
(45) Date of Patent: Dec. 10, 2024

(54) RANDOM ACCESS METHOD AND APPARATUS

(71) Applicant: Huawei Technologies Co., Ltd., Shenzhen (CN)

(72) Inventors: Weiwei Fan, Shanghai (CN); Mohamed Adel Salem, Ottawa (CA); David Jean-Marie Mazzarese, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 435 days.

(21) Appl. No.: 17/408,211

(22) Filed: Aug. 20, 2021

(65) Prior Publication Data

US 2021/0385863 A1 Dec. 9, 2021

Related U.S. Application Data

(63) Continuation of application No. PCT/CN2020/076066, filed on Feb. 20, 2020.

(30) Foreign Application Priority Data

Feb. 21, 2019 (CN) .......................... 201910129891.3

(51) Int. Cl.
*H04W 72/04* (2023.01)
*H04L 5/00* (2006.01)
(Continued)

(52) U.S. Cl.
CPC ..... *H04W 74/0816* (2013.01); *H04W 74/002* (2013.01); *H04W 74/0841* (2013.01)

(58) Field of Classification Search
None
See application file for complete search history.

(56) References Cited

U.S. PATENT DOCUMENTS 10,873,440 B2 * 12/2020 Liu ..................... H04L 27/2607
2016/0262118 A1 9/2016 Kim et al.
(Continued)

FOREIGN PATENT DOCUMENTS

CN 105578610 A 5/2016
CN 105992222 A 10/2016
(Continued)

OTHER PUBLICATIONS

Qualcomm Incorporated, "TP proposal for 38.889," 3GPP TSG RAN WG1 #95, Spokane, USA, R1-1814192, total 3 pages, 3rd Generation Partnership Project, Valbonne, France (Nov. 12-16, 2018).

(Continued)

*Primary Examiner* — Sithu Ko
(74) *Attorney, Agent, or Firm* — Leydig, Voit & Mayer, Ltd.

(57) ABSTRACT

A random access method is described that includes a network device determines a first channel access type used by a terminal device to access a first unlicensed frequency band, where the first channel access type is one of channel access types of an unlicensed frequency band, and there are two channel access types of the unlicensed frequency band: frame based equipment (FBE) and load based equipment (LBE). The network device sends a first system message to the terminal device, where the first system message carries first indication information, and the first indication information is used to indicate the first channel access type. The terminal device obtains the first system message from the network device, and accesses the first unlicensed frequency band by using the first channel access type indicated by the first indication information.

20 Claims, 15 Drawing Sheets

(51) Int. Cl.
   *H04W 74/00*      (2009.01)
   *H04W 74/0816*    (2024.01)
   *H04W 74/0833*    (2024.01)

(56) References Cited

U.S. PATENT DOCUMENTS

| | | | |
|---|---|---|---|
| 2018/0020375 A1 | 1/2018 | Matsumoto et al. | |
| 2018/0124749 A1* | 5/2018 | Park | H04W 16/14 |
| 2019/0029047 A1 | 1/2019 | Zhu et al. | |
| 2020/0137596 A1* | 4/2020 | Oh | H04W 56/001 |
| 2021/0298072 A1* | 9/2021 | Oh | H04W 74/006 |
| 2021/0298079 A1* | 9/2021 | Tomeba | H04W 72/0446 |
| 2021/0378012 A1* | 12/2021 | Kusashima | H04W 48/12 |
| 2022/0095375 A1* | 3/2022 | Oh | H04W 74/006 |
| 2022/0110152 A1* | 4/2022 | Lim | H04W 74/006 |
| 2022/0377683 A1* | 11/2022 | Myung | H04W 56/001 |

FOREIGN PATENT DOCUMENTS

| | | |
|---|---|---|
| CN | 105992384 A | 10/2016 |
| CN | 106301733 A | 1/2017 |
| CN | 107079491 A | 8/2017 |
| CN | 107431580 A | 12/2017 |
| CN | 107534873 A | 1/2018 |
| CN | 107567718 A | 1/2018 |
| CN | 107708159 A | 2/2018 |
| CN | 108024310 A | 5/2018 |
| CN | 109121198 A | 1/2019 |
| CN | 109156037 A | 1/2019 |
| CN | 109219152 A | 1/2019 |
| CN | 109246709 A | 1/2019 |
| CN | 109309961 A | 2/2019 |
| EP | 3836721 A1 | 6/2021 |
| IN | 201647037988 A | 12/2016 |
| WO | 2015196165 A1 | 12/2015 |
| WO | 2018113676 A1 | 6/2018 |
| WO | 2019019982 A1 | 1/2019 |
| WO | 2020167980 A1 | 8/2020 |

OTHER PUBLICATIONS

Lan Xin Yuan, "The Research of Coexistence between LTE-U and WiFi and LTE Random Access Schemes," Southwest Jiaotong University, Issue 10, total 2 pages (2018). With English abstract.

"3rd Generation Partnership Project; Technical Specification Group Radio Access Network; Physical layer procedures for shared spectrum channel access (Release 15)," 3GPP TS 37.213 V15.1.0, pp. 1-20, 3rd Generation Partnership Project, Valbonne, France (Sep. 2018).

"Channel access procedures for NR unlicensed," 3GPP TSG RAN WG1 Meeting #AH1901, Taipei, Taiwan, R1-1900873, XP051593719, Total 13 pages, 3rd Generation Partnership Project, Valbonne, France (Jan. 21-25, 2019).

"Coexistence and channel access for NR unlicensed band operations," 3GPP TSG RAN WG1 Meeting #96, Athens, Greece, R1-1901525, XP051599222, Total 21 pages, 3rd Generation Partnership Project, Valbonne, France (Feb. 25-Mar. 1, 2019).

"Channel access mechanism for NR-unlicensed," 3GPP TSG RAN WG1 Meeting #96, Athens, Greece, R1-1902471, XP051600167, Total 13 pages, 3rd Generation Partnership Project, Valbonne, France (Feb. 25-Mar. 1, 2019).

* cited by examiner

RANDOM ACCESS METHOD AND APPARATUS

CROSS-REFERENCE TO RELATED APPLICATIONS

This application is a continuation of International Application No. PCT/CN2020/076066, filed on Feb. 20, 2020, which claims priority to Chinese Patent Application No. 201910129891.3, filed on Feb. 21, 2019. The disclosures of the aforementioned applications are hereby incorporated by reference in their entireties.

TECHNICAL FIELD

This application relates to the field of wireless communications technologies, and more specifically, to a random access method and apparatus for an unlicensed frequency band.

BACKGROUND

In a wireless communications system, a terminal device may obtain downlink synchronization with a cell through cell search, so as to receive downlink data from a network device. However, the terminal device can perform uplink transmission only after obtaining uplink synchronization with a cell. By performing a random access procedure, the terminal device may establish a connection to the cell and obtain the uplink synchronization.

With continuous evolution of communications technologies, licensed spectrum resources become increasingly limited. A frequency band of the wireless communications system is extended from a licensed frequency band to an unlicensed frequency band. A communications system that works in the unlicensed frequency band and that is in new radio (NR) is also referred to as an NR-U (NR in unlicensed spectrum) system. In NR, a procedure in which the terminal device performs random access in the licensed frequency band is specified. The terminal device may perform the random access in the licensed frequency band in two manners: a contention-based manner and a non-contention-based manner. In a contention-based random access procedure, the terminal device first sends a message 1 (namely, a random access signal) in a random access channel occasion (RO) configured by the network device. If the network device detects the message 1, the network device feeds back a message 2 (namely, a random access response) to the terminal device. After monitoring, in a random access response window, the random access response sent by the network device, the terminal device sends a message 3 to the network device, where the message 3 carries identification information of the terminal device, and the identification information is used for contention resolution. Finally, the network device sends a message 4, where the message 4 is used to indicate a terminal device that wins in a conflict resolution process. A non-contention-based random access process does not include the conflict resolution process.

However, the NR-U needs to coexist with another system (e.g., wireless fidelity (Wi-Fi) or licensed assisted access (LAA)) in a friendly manner, and fairly contend for an available unlicensed frequency band. Consequently, random access efficiency is not high.

SUMMARY

This application provides a random access method. A network device senses a channel on an unlicensed frequency band, and sends a first system message to a terminal device when determining that the channel is idle. The first system message carries first indication information, and the first indication information is used to indicate a channel access type used by the terminal device to perform random access. Therefore, the terminal device can access an available unlicensed frequency band based on the channel access type indicated by the network device, so that a probability of a conflict with another system can be reduced, thereby improving random access efficiency.

According to a first aspect, this application provides a random access method. The method includes: A network device determines a first channel access type used by a terminal device to access a first unlicensed frequency band, where the first channel access type is one of channel access types of an unlicensed frequency band, and there are two channel access types of the unlicensed frequency band: frame based equipment FBE and load based equipment LBE. The network device sends a first system message to the terminal device, where the first system message carries first indication information, and the first indication information is used to indicate the first channel access type.

With reference to the first aspect, in some implementations of the first aspect, that the network device sends a first system message to the terminal device includes: The network device senses a channel within an idle period of a first FBE frame. When determining that a channel state is idle, the network device sends the first system message in a second FBE frame, where the first system message carries the first indication information, the first indication information is used to indicate that the first channel access type is FBE, and the second FBE frame is adjacent to the first FBE frame and is located after the first FBE frame.

With reference to the first aspect, in some implementations of the first aspect, the first system message further includes second indication information, and the second indication information is used to indicate a periodicity of an FBE frame of the network device.

With reference to the first aspect, in some implementations of the first aspect, the first system message further includes third indication information, and the third indication information is used to indicate rates of a channel occupancy time (COT) and an idle period of the FBE frame of the network device.

When the first channel access type is specifically FBE, the network device needs to indicate configuration information of the FBE frame on a network side to the terminal device, for example, the periodicity of the FBE frame, and the rates of the COT and the idle period, so that the terminal device performs random access.

With reference to the first aspect, in some implementations of the first aspect, a boundary of the FBE frame of the network device is aligned with or not aligned with a boundary of a radio frame sent by the network device in a licensed frequency band.

In this embodiment, the network device is not limited to communicating with the terminal device only when the boundary of the FBE frame is aligned with that of the radio frame. When the boundary of the FBE frame is not aligned with the boundary of the FBE frame, the network device may also communicate with the terminal device, so that flexibility of communication between the network device and the terminal device is improved.

With reference to the first aspect, in some implementations of the first aspect, the first system message further includes an offset of the boundary of the FBE frame of the network device relative to the boundary of the radio frame.

The terminal device obtains, from the first system message, the offset of the boundary of the FBE frame relative to the boundary of the radio frame. When the boundary of the FBE frame is not aligned with the boundary of the radio frame, the terminal device may determine the boundary of the radio frame based on the offset and the boundary of the detected FBE frame.

With reference to the first aspect, in some implementations of the first aspect, the method further includes: The network device sends first radio resource control RRC signaling to the terminal device, where the first RRC signaling carries configuration information of an FBE frame of the terminal device. The configuration information includes a period of a fixed frame period FFP of the FBE frame of the terminal device, and the period of the FBE frame of the terminal device is n times a period of the FBE frame of the network device, where n>1, and n is an integer.

The network device may configure, based on actual statuses of an uplink service and a downlink service of the terminal device, the period of the FFP of the FBE frame on a terminal side to be not equal to the period of the FFP on the network side. This may improve flexibility of uplink and downlink scheduling on the network side, and support different uplink and downlink service load requirements of the terminal device.

With reference to the first aspect, in some implementations of the first aspect, the first RRC signaling further carries an offset of a boundary of the FBE frame of the terminal device relative to the boundary of the FBE frame of the network device.

With reference to the first aspect, in some implementations of the first aspect, the method further includes: The network device sends fourth indication information to the terminal device, where the fourth indication information is used to indicate an effective remaining time of the first channel access type, and the first channel access type likely changes after the effective remaining time. The network device sends a second system message to the terminal device after the effective remaining time, where the second system message is used to indicate a channel access type that exists after the effective remaining time.

With reference to the first aspect, in some implementations of the first aspect, the method further includes: The network device sends second RRC signaling to the terminal device, where the second RRC signaling carries configuration information of an FBE frame of at least one second unlicensed frequency band other than a first unlicensed frequency band, and the at least one second unlicensed frequency band does not overlap the first unlicensed frequency band.

After the terminal device accesses the first unlicensed frequency band by using the first channel access type indicated by the network device, in some cases, for example, another inter-RAT (e.g., Wi-Fi or LAA) appears when an NR-U system is working, to fairly coexist with the another inter-RAT, or because load of a current cell or a degree of interference on a current cell changes, the NR-U needs to change the channel access type. In these cases, the network device may notify, in a broadcast manner, a terminal device that has accessed the cell to switch the channel access type, and may select an appropriate channel access type based on usage of an unlicensed frequency band, so as to reduce a probability of a conflict with another system.

With reference to the first aspect, in some implementations of the first aspect, uplink transmission performed by the terminal device is scheduled by the network device in the FBE frame of the network device when the network device senses that a channel state is idle.

With reference to the first aspect, in some implementations of the first aspect, the first system message is carried in a physical broadcast channel PBCH or remaining minimum system information RMSI.

According to a second aspect, a random access method is provided. The method includes: A terminal device obtains a first system message from a network device, where the first system message carries first indication information, and the first indication information is used to indicate a first channel access type used by the terminal device to perform random access. The first channel access type is one of channel access types of an unlicensed frequency band, and here are two channel access types of the unlicensed frequency band: frame based equipment FBE and load based equipment LBE. The terminal device accesses a first unlicensed frequency band by using the first channel access type.

With reference to the second aspect, in some implementations of the second aspect, that a terminal device obtains a first system message from a network device includes: The terminal device receives the first system message from a second FBE frame of the network device, where the first system message carries the first indication information, and the first indication information is used to indicate that the first channel access type is FBE.

With reference to the second aspect, in some implementations of the second aspect, the first system message further includes second indication information, and the second indication information is used to indicate a periodicity of an FBE frame of the network device.

With reference to the second aspect, in some implementations of the second aspect, the first system message further includes third indication information, and the third indication information is used to indicate rates of a COT and an idle period of the FBE frame of the network device.

With reference to the second aspect, in some implementations of the first aspect, a boundary of the FBE frame of the network device is aligned with or not aligned with a boundary of a radio frame sent by the network device in a licensed frequency band.

With reference to the second aspect, in some implementations of the second aspect, the first system message further includes an offset of the boundary of the FBE frame of the network device relative to the boundary of the radio frame. In addition, the method further includes: The terminal device determines the boundary of the radio frame based on the offset and the boundary of the FBE frame.

With reference to the second aspect, in some implementations of the second aspect, the method further includes: The terminal device receives first radio resource control RRC signaling from the network device, where the first RRC signaling carries configuration information of an FBE frame of the terminal device. The configuration information includes a period of a fixed frame period FFP of the FBE frame of the terminal device, and the period of the FFP of the FBE frame of the terminal device is n times a period of an FFP of the FBE frame of the network device, where n>1, and n is an integer. The terminal device determines configuration of the FBE frame of the terminal device based on the first system message and the first RRC signaling.

With reference to the second aspect, in some implementations of the second aspect, the first RRC signaling further carries an offset of the FBE frame of the terminal device relative to the FBE frame of the network device.

With reference to the second aspect, in some implementations of the second aspect, the first system message carries information used to indicate a random access channel RACH resource, and the first system message is carried in a synchronization signal block SSB. The method further includes: The terminal device senses a channel within an idle period of a third FBE frame. When determining that a channel state is idle, the terminal device sends a random access signal on a RACH resource that is located at a frame header of a fourth FBE frame, where no SSB exists in the fourth FBE frame, and the fourth FBE frame is located after the third FBE frame and is adjacent to the third FBE frame.

With reference to the second aspect, in some implementations of the second aspect, the method further includes: The terminal device monitors a downlink signal in a frame header of a fifth FBE frame of the network device. When the terminal device detects the downlink signal in the frame header of the fifth FBE frame, the terminal device sends a random access signal on a RACH resource of the fifth FBE frame.

With reference to the second aspect, in some implementations of the second aspect, after the terminal device sends the random access signal on the RACH resource of the fifth FBE frame, the method further includes: The terminal device monitors a random access response within a random access response window. When the random access response window overlaps an idle period of a sixth FBE frame, the terminal device monitors the random access response in a first time period and a second time period of the random access response window, and skips monitoring the random access response within an overlapping part of the random access response window and the idle period of the sixth frame, where the first time period is located in the sixth FBE frame, and the second time period is located in a seventh FBE frame. A sum of duration of the first time period and the second time period is equal to a period of the random access response window, the sixth FBE frame and the fifth FBE frame are a same FBE frame or the sixth FBE frame is located after the fifth FBE frame, and the seventh FBE frame is located after the sixth FBE frame.

With reference to the second aspect, in some implementations of the second aspect, after the terminal device accesses the first unlicensed frequency band by using the first channel access type, the method further includes: The terminal device receives fourth indication information from the network device, where the fourth indication information is used to indicate an effective remaining time of the first channel access type, and the first channel access type likely changes after the effective remaining time. The terminal device receives a second system message from the network device after the effective remaining time, and determines, based on an indication of the second system message, a channel access type that exists after the effective remaining time.

With reference to the second aspect, in some implementations of the second aspect, the method further includes: The terminal device receives second RRC signaling from the network device, where the second RRC signaling carries configuration information of an FBE frame of at least one second unlicensed frequency band other than a first unlicensed frequency band, and the at least one second unlicensed frequency band is different from the first unlicensed frequency band.

With reference to the second aspect, in some implementations of the second aspect, uplink transmission performed by the terminal device is scheduled by the network device in the FBE frame of the network device when the network device senses that a channel state is idle.

With reference to the second aspect, in some implementations of the second aspect, the first system message is carried in a physical broadcast channel PBCH or remaining minimum system information RMSI.

For beneficial effects of the embodiments of the second aspect, refer to corresponding descriptions of the first aspect. Details are not described again.

According to a third aspect, this application provides a random access apparatus. The apparatus has a function of implementing the method in any one of the first aspect and the possible implementations of the first aspect. The function may be implemented by hardware, or may be implemented by hardware by executing corresponding software. The hardware or the software includes one or more units corresponding to the foregoing functions.

According to a fourth aspect, this application provides a random access apparatus. The apparatus has a function of implementing the method in any one of the second aspect and the possible implementations of the second aspect. The function may be implemented by hardware, or may be implemented by hardware by executing corresponding software. The hardware or the software includes one or more units corresponding to the foregoing functions.

According to a fifth aspect, this application provides a network device, including a processor and a memory. The memory is configured to store a computer program, and the processor is configured to invoke and run the computer program stored in the memory, so that the network device performs the method in any one of the first aspect or the possible implementations of the first aspect.

Optionally, the network device further includes a communications interface. The communications interface may be a transceiver or an input/output interface.

According to a sixth aspect, this application provides a terminal device, including a processor and a memory. The memory is configured to store a computer program, and the processor is configured to invoke and run the computer program stored in the memory, so that the terminal device performs the method in any one of the second aspect or the possible implementations of the second aspect.

Optionally, the terminal device further includes a communications interface. The communications interface may be a transceiver or an input/output interface.

According to a seventh aspect, this application provides a computer-readable storage medium. The computer-readable storage medium stores a computer instruction. When the computer instruction is run on a computer, the computer is enabled to perform the method in any one of the first aspect or the possible implementations of the first aspect.

According to an eighth aspect, this application provides a computer-readable storage medium. The computer-readable storage medium stores a computer instruction. When the computer instruction is run on a computer, the computer is enabled to perform the method in any one of the second aspect or the possible implementations of the second aspect.

According to a ninth aspect, this application provides a chip, including a processor. The processor is configured to read and execute a computer program stored in a memory, to perform the method in any one of the first aspect or the possible implementations of the first aspect.

Optionally, the chip further includes a memory. The memory and the processor are connected to each other by using a circuit or a wire. The memory is configured to store a computer program.

Further, optionally, the chip includes a communications interface.

According to a tenth aspect, this application provides a chip, including a processor. The processor is configured to read and execute a computer program stored in a memory, to perform the method in any one of the second aspect or the possible implementations of the second aspect.

Optionally, the chip further includes a memory. The memory and the processor are connected to each other by using a circuit or a wire. The memory is configured to store a computer program.

Further, optionally, the chip includes a communications interface.

According to an eleventh aspect, this application further provides a computer program product. The computer program product includes computer program code. When the computer program code is run on a computer, the computer is enabled to perform the method in any one of the first aspect and the possible implementations of the first aspect.

According to a twelfth aspect, this application further provides a computer program product. The computer program product includes computer program code. When the computer program code is run on a computer, the computer is enabled to perform the method in any one of the second aspect and the possible implementations of the second aspect.

In the technical solutions of this application, a network device senses a channel on an unlicensed frequency band, and sends a first system message to a terminal device when determining that the channel is idle. The first system message carries first indication information, and the first indication information is used to indicate a channel access type used by the terminal device to perform random access. Therefore, the terminal device can access an available unlicensed frequency band based on the channel access type indicated by the network device, so that a probability of a conflict with another system can be reduced, thereby improving random access efficiency.

DESCRIPTION OF EMBODIMENTS

The following describes technical solutions in this application with reference to the accompanying drawings.

The technical solutions of this application are mainly used in a wireless communications system working in an unlicensed frequency band, for example, a new radio (NR) unlicensed system (referred to as NR-U below). In addition, the technical solutions may also be used in another communications system in which one communications device needs to indicate a channel access type to another communications device.

The wireless communications system in this application includes but is not limited to: a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, a new radio (NR) system, a wireless local area network (WLAN), and the like.

The network device in this application includes but is not limited to: an evolved NodeB (eNB), a radio network controller (RNC), a NodeB (NB), a base station controller (BSC), a base transceiver station (BTS), a home evolved NodeB (home NodeB, HNB), a baseband unit (BBU), an evolved LTE (eLTE) base station, an NR base station (next generation NodeB, gNB), and the like.

The terminal device in this application includes but is not limited to any one of user equipment (UE), a mobile station, an access terminal, a subscriber unit, a subscriber station, a mobile console, a remote station, a remote terminal, a mobile device, a terminal, a wireless communications device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a future 5G network, a terminal device in a future evolved public land mobile network (PLMN), and the like.

Figure 1:
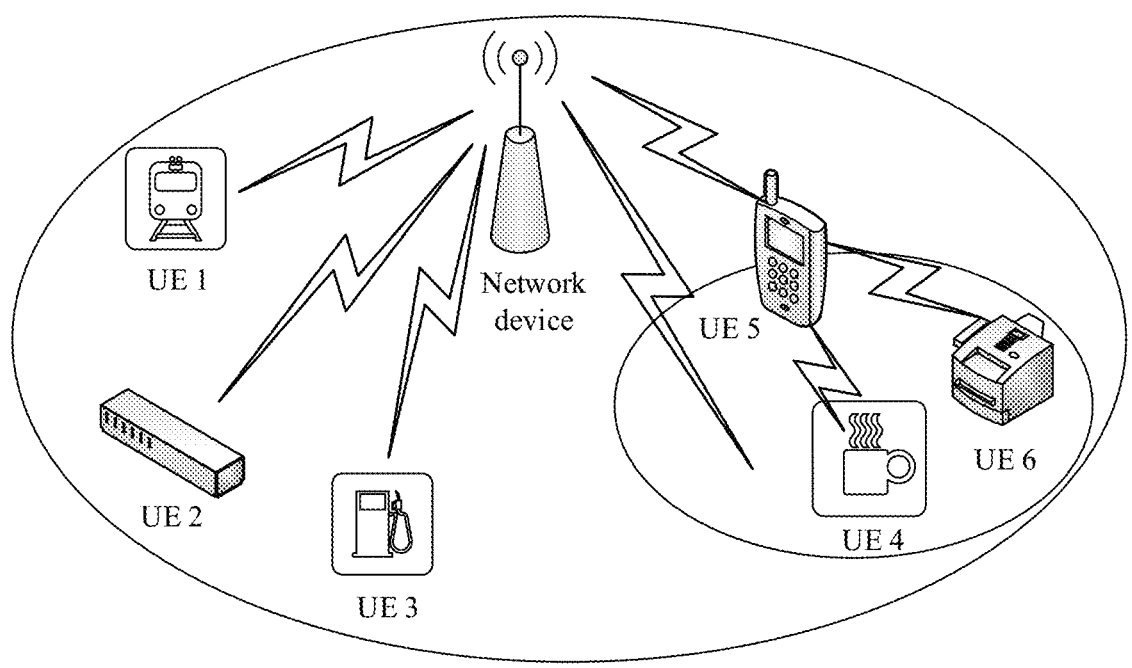
FIG. 1 shows an example of an architecture of a communications system applicable to an embodiment of this application.

FIG. 1 shows an example of an architecture of a communications system applicable to an embodiment of this application. As shown in FIG. 1, a network device and terminal devices UE 1 to UE 6 form a communications system. In the communications system, the UE 1 to the UE 6 may send uplink data to the network device, and the network device needs to receive the uplink data sent by the UE 1 to the UE 6. In addition, the UE 4 to the UE 6 may also form a communications system. In the communications system, the network device may send downlink information to the UE 1, the UE 2, and the UE 5. The UE 5 may also send downlink information to the UE 4 and the UE 6.

To facilitate understanding of the technical solutions in this application, technologies related to this application are briefly described herein. In an unlicensed frequency band, a transmit node needs to use the unlicensed frequency band in a contention manner. According to a definition of the European Telecommunications Standards Institute (ETSI), channel access types of the unlicensed frequency band mainly include load based equipment (LBE) and fixed frame based equipment (FBE). In other words, there are two channel detection mechanisms in the unlicensed frequency band: a frame-structure-based (that is, FBE-based) channel detection mechanism and a load-based (LBE-based) channel detection mechanism. Currently, most mainstream communications systems, for example, a Wi-Fi system and an LAA system, working in unlicensed frequency bands use an LBE channel access manner.

The load-based channel detection mechanism means that when a service arrives at a device, initial CCA detection is triggered. If the device detects, through the initial CCA, that a channel state is idle, the device may immediately occupy the channel, where a channel occupancy time is preset. If the device detects, through the initial CCA, that a channel state is busy, a defer period needs to be generated. If it is detected that the channel state is busy within the defer period, a defer period continues to be generated, and then an extended clear channel assessment (extended CCA, ECCA) is not performed until it is detected that the channel state is idle within a defer period.

Detection duration of the ECCA is determined by a quantity N of times of channel detection backoff, where N is a random CCA detection time value generated between (1, q), and q is preset. If in this period, it is detected that the channel state is busy in the CCA detection time, a defer period also needs to be generated, and an ECCA process is not continued until it is detected that the channel is idle within a defer period. The device can occupy the channel only after detecting, in N CCA detection times, that the channel is idle, where a channel occupancy time is also preset.

The frame-structure-based channel detection mechanism means that: a periodicity is set, and listen before talk (LBT) channel detection is performed once at a fixed location in each periodicity. A channel detection time is also referred to as a channel clear assessment (CCA) detection time. If a device detects, in the CCA detection time, that the channel state is idle, the device may immediately occupy the channel. A channel occupancy time is a preset fixed value. If the device detects, in the CCA detection time, that the channel state is non-idle, the device cannot occupy the channel in this periodicity, and continues to perform LBT channel detection at a fixed location in a next periodicity.

Figure 2:
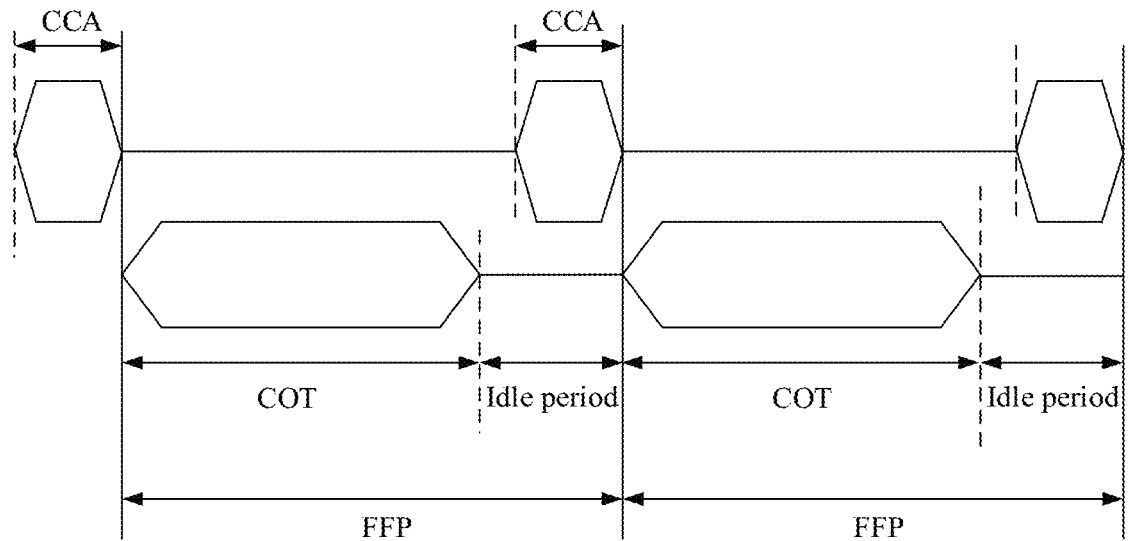
FIG. 2 is a schematic structural diagram of an FBE frame.

FIG. 2 is a schematic structural diagram of an FBE frame. As shown in FIG. 2, a sending periodicity of the FBE frame is referred to as a fixed frame period (fixed frame period, FFP). A period of the FFP ranges between 1 ms and 10 ms. Usually, a periodicity of the FFP cannot be changed within 200 ms. An FFP includes two parts: a channel occupancy time (channel occupancy period, COT) and an idle period. The idle period is used by an initiating device of the FBE frame to perform a CCA. If the initiating device senses that a channel state is idle, the initiating device may send a signal in a subsequent COT. The initiating device may share a sending opportunity with another or more devices during the COT, and these devices are referred to as responding devices. If a sending gap between the initiating device and the responding device is shorter than 16 μs, the responding device does not need to perform an additional CCA. Otherwise, the responding device needs to perform a CCA with duration of an observation slot.

It can be learned that, different from the FBE, the LBE does not have a fixed frame period.

As specified in NR, a terminal device may perform random access in a licensed frequency band in two manners: a contention-based manner and a non-contention-based manner. For contention-based random access, an entire process includes four steps, as shown in FIG. 3.

Figure 3:
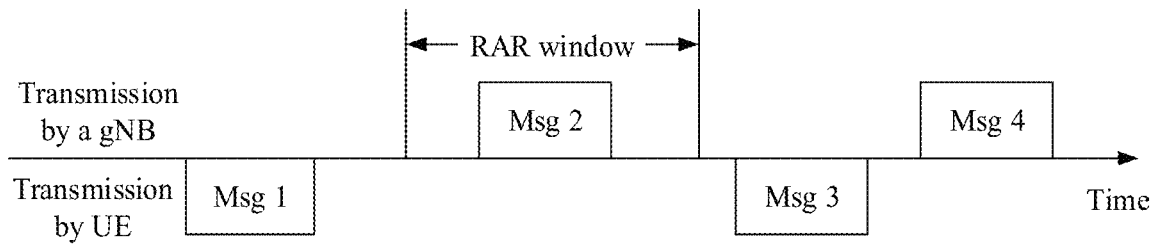
FIG. 3 is a schematic diagram of a contention-based random access process.

FIG. 3 is a schematic diagram of a contention-based random access process. As shown in FIG. 3, four steps of the access process are roughly as follows: 1. UE sends a random access preamble (a message 1, a Msg 1 for short) on a RACH resource indicated by a gNB. 2. The UE monitors, within a random access response window (RAR window), a message 2 (Msg 2) sent by the gNB. The gNB determines an uplink timing advance (TA) of the UE based on a time-frequency location of the received Msg 1, and includes the TA in the Msg 2. The Msg 2 also carries a time-frequency location of a message 3 (Msg 3) sent by the UE. 3. After receiving the Msg 2, the UE sends the Msg 3 in the time-frequency location indicated by the Msg 2, where the Msg 3 carries identification information of the UE. 4. The gNB indicates, by sending a message 4 (Msg 4), UE that wins the contention.

It can be learned that a random access process of a licensed frequency band does not involve a procedure in which a terminal device selects a channel access type. However, in a random access process of an unlicensed frequency band, the terminal device needs to access a cell by using one of the foregoing FBE and LBE. Therefore, when a random access procedure in NR is used in an NR-U, the terminal device cannot learn of a channel access type used to access a network.

Therefore, this application provides a random access solution, used in a scenario in which a terminal device accesses a cell in an unlicensed frequency band.

It should be noted that a communications system working in the licensed frequency band defines a radio frame for signal transmission. A period of one radio frame is 10 ms, and the radio frame includes 10 sub-frames (subframe) whose duration is 1 ms. Each sub-frame includes one or more slots (slot), and each slot includes 14 symbols (symbol). That each sub-frame includes one or more slots is designed in NR to ensure that periods of radio frames at different subcarrier spacings are all 10 ms. For example, when a subcarrier spacing is 15 kHz (kilohertz), one sub-frame includes one slot. When a subcarrier spacing is 30 kHz, one sub-frame includes two slots. When a subcarrier spacing is 60 kHz, one sub-frame includes four slots. For detailed descriptions of the radio frame, refer to the conventional technology, for example, refer to the protocol NR 38.201. Details are not described herein.

However, in a wireless communications system working in the unlicensed frequency band, in an FBE-based channel detection mechanism, a device (e.g., a network device or a terminal device) transmits a signal based on a fixed frame format. The fixed frame format herein is referred to as an FBE frame. One FBE frame includes a COT and an idle period. For details, refer to FIG. 2.

Numbers appearing in the following embodiments, for example, "first" and "second", are merely used to distinguish between different described objects, for example, distinguish between different system messages, different FBE frames, or different RRC signaling, and should not be construed as a limitation on the technical solutions of this application.

Figure 4:
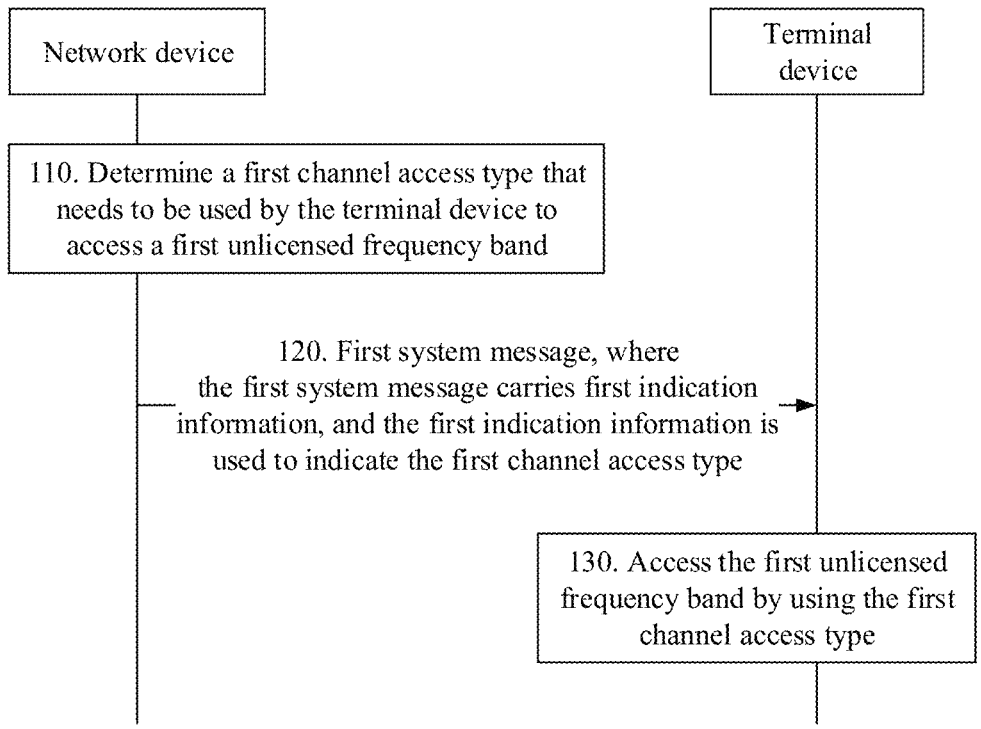
FIG. 4 is a schematic interaction diagram of a random access method 100 according to this application.

FIG. 4 is a schematic interaction diagram of a random access method 100 according to this application.

110. A network device determines a first channel access type used by a terminal device to access a first unlicensed frequency band.

The first channel access type is one of channel access types of an unlicensed frequency band. There are two channel access types of the unlicensed frequency band: FBE and LBE.

Herein, the first unlicensed frequency band is any segment that can be used for wireless communication and that is in the unlicensed frequency band.

In step 110, the network device may determine, based on a plurality of factors, the channel access type used by the terminal device to access the unlicensed frequency band. In an example, to harmoniously coexist with another system, the network device may determine that the terminal device uses a same channel access type as that used by the another system. For example, a Wi-Fi system further exists in the first unlicensed frequency band. If the Wi-Fi system uses an FBE mechanism, the network device determines that the terminal device accesses the first unlicensed frequency band by using the FBE mechanism. If the Wi-Fi system uses an LBE mechanism, the network device determines that the terminal device accesses the first unlicensed frequency band by using the LBE mechanism. Alternatively, the network device may further determine the channel access type based on another factor, for example, based on load of the unlicensed frequency band, a degree of interference between subcarriers, or based on some stipulations in a regulation or a protocol. This is not limited in this application.

120. The network device sends a first system message to the terminal device. The terminal device obtains the first system message from the network device.

The first system message carries first indication information, and the first indication information is used to indicate the first channel access type used by the terminal device to perform random access.

130. The terminal device accesses the first unlicensed frequency band by using the first channel access type.

For the terminal device, the terminal device obtains the first system message from the network device, and obtains the first indication information by parsing the first system message. The terminal device may learn of, based on the first indication information, the first channel access type indicated by the network device. The first channel access type may be specifically the FBE or the LBE.

In the technical solutions of this application, after determining the channel access type used by the terminal device, the network device includes the first indication information in the sent first system message, where the first indication information is used to indicate the channel access type used by the terminal device to access the first unlicensed frequency band. The terminal device accesses the first unlicensed frequency band based on the first channel access type indicated by the network device, so that a probability of a conflict with another system can be reduced, thereby improving random access efficiency.

In addition, the technical solutions of this application may resolve a problem that in the current NR, a terminal device cannot learn of a channel access type before performing random access in an unlicensed frequency band.

In step 120, as an initiating device, the network device may send the first system message based on the LBE or the FBE.

In an embodiment, after obtaining a use right of a channel based on the LBE-based channel detection mechanism described above, the network device sends the first system message. The first system message carries the first indication information, and the first indication information is used to indicate that the first channel access type is the LBE. For UE, the UE serves as a responding device and accesses the unlicensed frequency band by using the LBE. For a detailed process on a UE side, refer to the conventional technology. Details are not described in this specification.

In another embodiment, the network device senses a channel within an idle period of a first FBE frame. When determining that a channel state is idle, the network device sends the first system message in a second FBE frame. The terminal device receives the first system message in the second FBE frame of the network device. The first system message carries the first indication information, and the first indication information indicates that the first channel access type is the FBE.

Herein, the second FBE frame and the first FBE frame are adjacent, and the second FBE frame is located after the first FBE frame. The network device sends the first system message in the second FBE frame. It can be learned from the foregoing descriptions of the FBE frame in FIG. 2 that, the network device may send the first system message in a COT of the second FBE frame.

It should be understood that, the network device senses the channel within the idle period of the first FBE frame. If the channel state is idle, the network device may immediately occupy the channel. Therefore, the network device sends the first system message in a COT of a next FBE frame (namely, the second FBE frame) that exists after the first FBE frame.

Specifically, the network device may send a synchronization signal block (SSB) in the COT of the second FBE frame. For example, the network device sends the SSB in a frame header of the second FBE frame. The SSB includes a primary synchronization signal (PSS), a secondary synchronization signal (SSS), a physical broadcast channel (PBCH), and another signal. The another signal herein may be, for example, a reference signal. The first system information may be carried on the PBCH. The terminal device obtains the first system information by monitoring the PBCH of the SSB. Alternatively, the first system information may alternatively be carried in remaining minimum system information (RMSI).

When the first channel access type is specifically the FBE, the first system message further includes second indication information, and the second indication information is used to indicate a periodicity of an FBE frame on a network side.

In an implementation, the second indication information is used to indicate an index value in a table. The table includes predefined periods of a plurality of FFPs. The period of each FFP corresponds to an index. In this case, the second indication information indicates an index value in the table, that is, indicates a period of an FFP of the FBE frame on the network side.

In another implementation, the periodicity that is of the FBE frame on the network side and that is indicated by the second indication information may be a value of a quantity of slots (namely, slot) or symbols (symbol) of a default subcarrier spacing.

Further, the first system message includes third indication information, and third indication information is used to indicate rates of a COT and an idle period of the FBE frame of the network device.

In an implementation, the rates of the COT and the idle period of the FBE frame may also be index values of a table, and the table includes several predetermined values of rates of the COT and the idle period. Alternatively, the rates of the COT and the idle period of the FBE frame may alternatively be based on a value of quantity of slots or symbols of a default subcarrier spacing.

In an implementation, a field in the first system message may carry the first indication information. When the network device indicates that the first channel access type is the FBE, a subsequent field in the first system message further needs to carry the second indication information and the third indication information.

Optionally, that the first indication information, the second indication information, and the third indication information are carried in a same system message (namely, the first system message) is merely used as an embodiment. In another embodiment, the first indication information, the second indication information, and the third indication information may be separately carried in different system messages. This is not limited in this application.

In this application, a boundary of the FBE frame on the network side may be aligned with or not aligned with a boundary of a radio frame. Descriptions are separately provided below.

Case 1

The boundary of the FBE frame is aligned with the boundary of the radio frame.

As described above, the radio frame is a frame format used by the network device to transmit a signal in a licensed frequency band. The FBE frame is a frame format used by the network device to transmit a signal in the unlicensed frequency band. That the boundary of the FBE frame is aligned with the boundary of the radio frame means that a start point of the FBE frame overlaps a start point of the radio frame in time domain. In other words, a start symbol (namely, the first symbol) of the FBE frame in time domain is the same as a start symbol of the radio frame in time domain.

Figure 5:
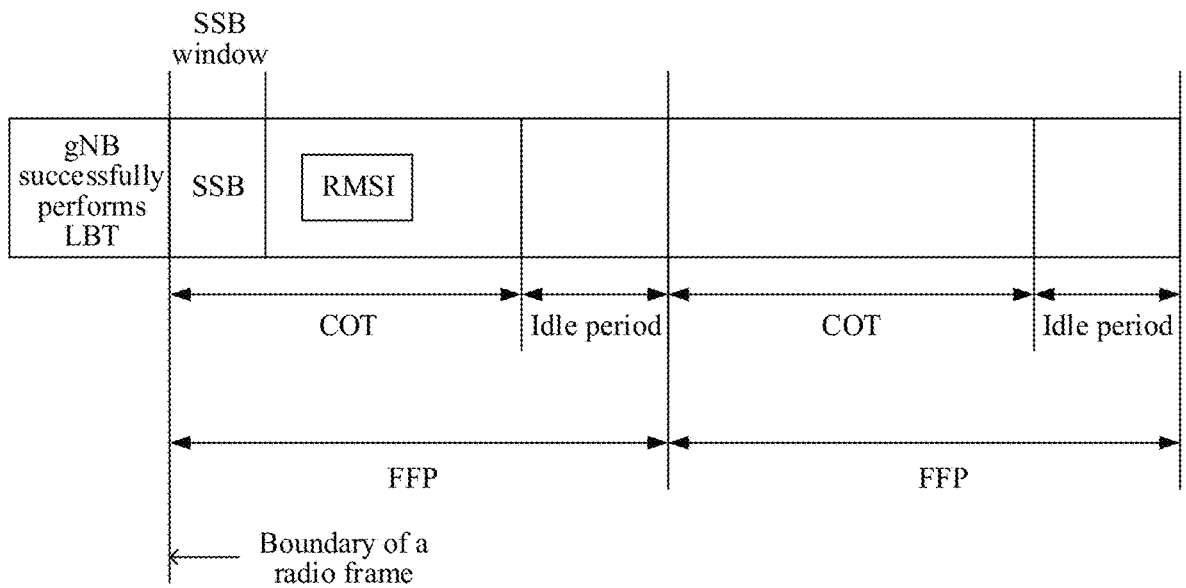
FIG. 5 is a schematic diagram in which a boundary of an FBE frame is aligned with a boundary of a radio frame.

FIG. 5 is a schematic diagram in which a boundary of an FBE frame is aligned with a boundary of a radio frame. As shown in FIG. 5, the network device performs one-slot LBT in an observation slot that exists before the boundary of the radio frame. If the LBT succeeds, the network device sends an SSB at a start point of the boundary of the radio frame.

Case 2

The boundary of the FBE frame is not aligned with the boundary of the radio frame.

To enable the network device to more efficiently access a channel, the network device does not need to send the SSB on a premise that the boundary of the FBE frame is aligned with the boundary of the radio frame. In the case 2, the network device may use any symbol boundary as a boundary of the FBE frame. In this case, the network device needs to indicate, in a system message, an offset of the boundary of the FBE frame relative to the boundary of the radio frame.

In an implementation, the offset of the boundary of the FBE frame relative to the boundary of the radio frame may be based on a quantity of symbols of a default subcarrier spacing, or the offset may be an absolute time.

After obtaining the offset from the first system information, the terminal device may determine the boundary of the radio frame based on the offset and the boundary of the FBE frame.

In another possible implementation, the offset of the boundary of the FBE frame relative to the boundary of the radio frame may be notified by the network device by using radio resource control (RRC) signaling to the terminal device that needs to perform access.

Figure 6:
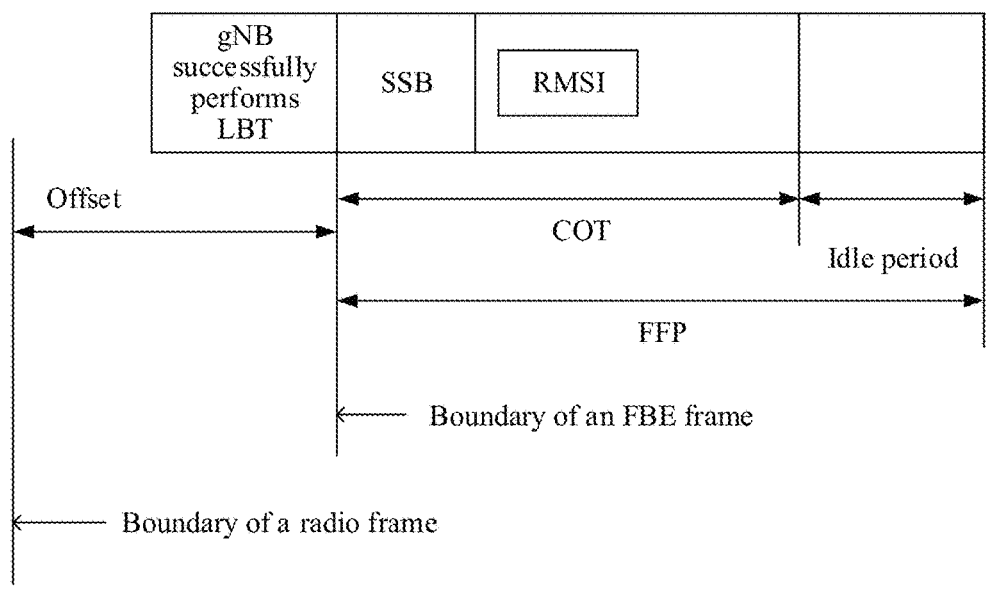
FIG. 6 is a schematic diagram in which a boundary of an FBE frame is not aligned with a boundary of a radio frame.

FIG. 6 is a schematic diagram in which a boundary of an FBE frame is not aligned with a boundary of a radio frame. As shown in FIG. 6, the network device performs one-slot LBT in an observation slot that exists before the boundary of the radio frame. If the LBT succeeds, the network device further determines the boundary of the radio frame based on the offset that is indicated in the first system message and that is of the boundary of the FBE frame relative to the boundary of the radio frame.

Both the foregoing first FBE frame and second FBE frame are FBE frames on the network side. It can be learned from descriptions in the case 1 and the case 2 that, the boundary of the FBE frame on the network side may be aligned with the boundary of the radio frame, or may be not aligned with the boundary of the radio frame. Therefore, a boundary of the first FBE frame may be aligned with or not aligned with the boundary of the radio frame, and a boundary of the second FBE frame may also be aligned with or not aligned with the boundary of the radio frame. This is not limited in this application. For example, when a periodicity of the radio frame is an integer multiple (greater than 1) of the periodicity of the FBE frame, the boundary of the first FBE frame is aligned with the boundary of the radio frame, and the boundary of the second FBE frame is not aligned with the boundary of the radio frame.

The network device configures the FBE frame when the boundary of the FBE frame is not aligned with the boundary of the radio frame, so that the network device can more efficiently access a channel.

It should be noted that, in this implementation, an FBE frame on the network side and an FBE frame on a terminal side need to be distinguished.

In an embodiment, the network device may configure a boundary of the FBE frame on the terminal side to be aligned with a boundary of the FBE frame on the network side.

Optionally, the network device may further configure a period of an FFP of the FBE frame on the terminal side to be the same as a period of an FFP of the FBE frame on the network side.

In this embodiment, after completing cell access, the terminal device may determine configuration information (or a configuration parameter) of the FBE frame on the network side, for example, the period of the FFP of the FBE frame on the terminal device side, the rates of the COT and the idle period of the FBE frame. Therefore, the network device does not need to additionally indicate configuration information of the FBE frame on the terminal side.

Optionally, the network device may configure the period of the FFP of the FBE frame on the terminal side to be not equal to the period of the FFP of the FBE frame on the network side.

For example, when an uplink service and a downlink service of the terminal device are asymmetric, if the uplink service is far more than the downlink service, the network device may configure the period of the FFP of the FBE frame on the terminal side to be greater than the period of the FFP of the FBE frame on the network side. In an example, the network device configures the period of the FFP of the FBE frame on the terminal side to be n times the period of the FFP of the FBE frame on the network side, where n>1, and n is an integer. In other words, the period of the FFP of the FBE frame on the terminal side is an integer multiple of the period of the FFP of the FBE frame on the network side. In this solution, the network device needs to notify the terminal device of the configuration information of the FBE frame on the terminal side, for example, information such as the period of the FFP, and the rates of the COT and the idle period.

In an implementation, the network device may complete configuration of the FBE frame on the terminal side for the terminal device by using first RRC signaling.

In another embodiment, the network device configures the boundary of the FBE frame on the terminal side to be not aligned with the boundary of the FBE frame on the network side.

The network device may indicate the configuration information of the FBE frame of the terminal device to the terminal device by using the first RRC signaling. In a cell access process, the terminal device may obtain the configuration information of the FBE frame on the terminal side by using the first RRC signaling.

For example, the network device indicates, to the terminal device by using the first RRC signaling, an offset of the boundary of the FBE frame on the terminal side relative to the boundary of the FBE frame on the network side, the period of the FFP, the rates of the COT and the idle period, and the like, so that the terminal device can obtain the configuration parameter of the FBE frame on the terminal side.

In another embodiment, the network device may indicate, to the terminal device, configuration information of an FBE frame of an unlicensed frequency band other than a first unlicensed frequency band.

In this specification, the unlicensed frequency band other than a first unlicensed frequency band is collectively referred to as a second unlicensed frequency band. There may be one or more second unlicensed frequency bands herein. When there are a plurality of second unlicensed frequency bands, the plurality of second unlicensed frequency bands are different from the first unlicensed frequency band by default.

The network device indicates configuration information of an FBE frame of the second unlicensed frequency band to the terminal device, so that after the terminal device accesses the first unlicensed frequency band, the terminal device may switch to a second unlicensed frequency band when the terminal device needs to switch the unlicensed frequency band.

Optionally, the network device may include configuration information of an FBE frame of at least one second unlicensed frequency band in the second RRC signaling.

Herein, the configuration information of the FBE frame of the second unlicensed frequency band includes, for example, information such as a boundary of the FBE frame of the second unlicensed frequency band, rates of the COT and the idle period, and a period of the FFP.

Optionally, the second RRC signaling and the first RRC signaling may be same RRC signaling. This is not limited in this application.

The network device configures boundaries of FBE frames on the network side and terminal side to be not aligned and/or FFP periodicities are not equal. This helps the network device more flexibly perform uplink and downlink scheduling, and can support different uplink service load requirements of the terminal device.

After the terminal device accesses the first unlicensed frequency band by using the first channel access type indicated by the network device, in some cases, for example, another inter-RAT (e.g., Wi-Fi or LAA) appears when an NR-U system is working, to fairly coexist with the another inter-RAT, or because load of a current cell or a degree of interference on a current cell changes, the NR-U needs to change the channel access type. In these cases, the network device may notify, in a broadcast manner, a terminal device that has accessed the cell to switch the channel access type.

In an implementation, the network device sends fourth indication information to the terminal device, where the fourth indication information is used to indicate an effective remaining time of the first channel access type. The network device sends the fourth indication information to the terminal device, to indicate that the channel access type of the current cell likely changes after the effective remaining time.

Optionally, the fourth indication information may be carried in the first system message. This is not limited in this specification.

The terminal device needs to read, based on an indication of the fourth indication information and after a time length of the effective remaining time, a second system message sent by the network device, and access the cell based on a channel access type indicated in the second system message. The second system message may be carried on the PBCH of the SSB or carried in the RMSI.

That the network device indicates the effective remaining time of the first channel access type to the terminal device may be considered as that the network device imposes some constraints on a behavior of reading a system message by the terminal device. Usually, the terminal device reads the system message based on a requirement or based on a periodicity, and does not need to always read the system message. When the system message does not change, the terminal device usually does not need to re-read the system message. The network device indicates the effective remaining time of the first channel access type to the terminal device, and the terminal device may learn that the channel access type does not change during the effective remaining time. Therefore, the terminal device does not need to read the system message. After the effective remaining time, the terminal device re-reads the system message (namely, the foregoing second system message), and determines, based on the channel access type indicated in the second system message, whether the channel access type needs to be switched.

Herein, the effective remaining time may be a quantity of slots corresponding to a default subcarrier spacing, or may be a value in a unit of a symbol, or may be a value of an absolute time. This is not limited herein.

In an embodiment, the network device may indicate the effective remaining time to the terminal device in a semi-static manner such as by using RRC signaling or a paging message. In another embodiment, the network device may also dynamically notify, by using downlink control information (DCI), the terminal device that has accessed the cell of the effective remaining time of the current channel access type.

According to this embodiment, when the NR-U coexists with another inter-RAT (e.g., Wi-Fi), or another inter-RAT occurs when the NR-U system is working, or load of the cell or a degree of interference on the cell changes, the terminal device may switch between an FBE channel type and an LBE channel type, to select an appropriate channel access type. Therefore, communication quality can be improved.

It can be learned from the 4-step random access procedure that is performed by the terminal device in NR and described in FIG. 3 that, the random access procedure is initiated by the terminal device by sending a random access signal to the network device on a RACH resource. However, because a sending periodicity of the SSB may be greater than a periodicity of the FBE frame on the network side, no SSB exists in some FBE frames on the network side. The following problem may exist when the RACH resource is configured in the FBE frame in which no SSB exists: If the network device configures the RACH resource at a non-header location of the FBE frame, and if the network device fails to perform LBT and does not obtain a use right of the FBE frame, the UE cannot send a random access signal (namely, the Msg 1) on the RACH resource of the FBE frame, resulting in a waste of the RACH resource.

Therefore, this application further proposes the following several solutions to resolve a configuration problem of the RACH resource in the FBE frame.

Solution 1

The network device configures the RACH resource only at the frame header location of the FBE frame in which no SSB exists.

For the terminal device, the terminal device senses a channel within an idle period of a third FBE frame. When determining that a channel state is idle, the terminal device sends a random access signal at a frame header location of a fourth FBE frame, where the fourth FBE frame is located after the third FBE frame and is adjacent to the third FBE frame.

It should be noted that the third FBE frame and the fourth FBE frame herein are merely intended to be distinguished from the first FBE frame and the second FBE frame on the network side in the foregoing descriptions.

Figure 7:
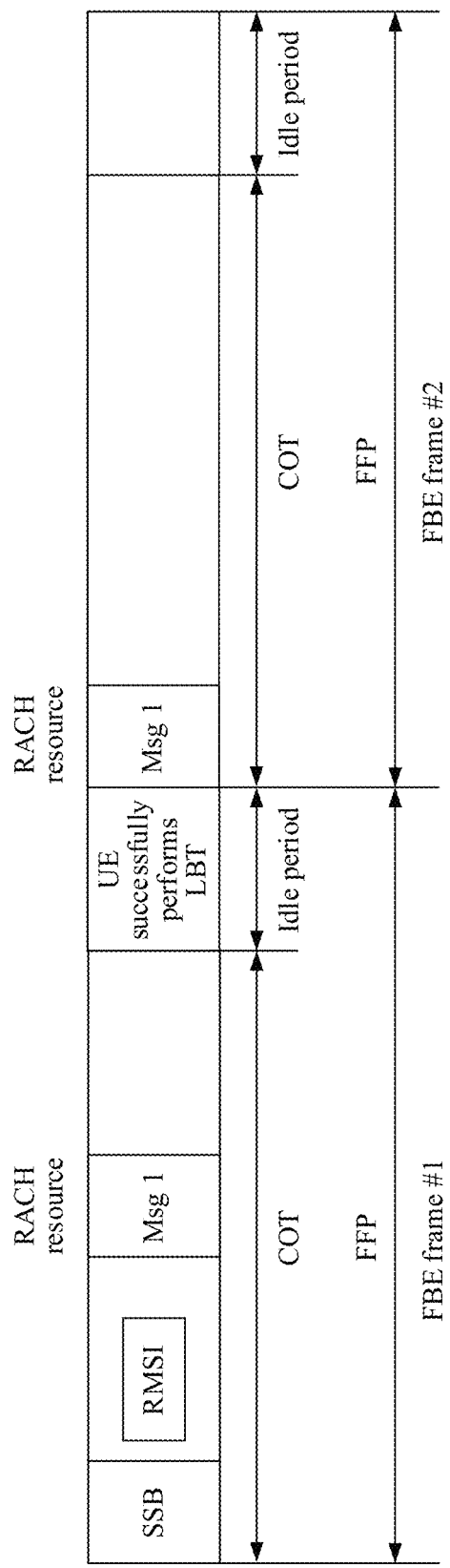
FIG. 7 is a schematic diagram of configuring a RACH resource in a frame header of an FBE frame in which no SSB exists.

FIG. 7 is a schematic diagram of configuring a RACH resource in a frame header of an FBE frame in which no SSB exists. An FBE frame #1 includes an SSB, and an FBE frame #2 does not include an SSB. A RACH resource is configured at a frame header location of an FBE frame in which no SSB exists. Once a use right of the FBE frame in which no SSB exists is obtained, a Msg 1 may be sent on the RACH resource configured at the frame header location. The terminal device performs LBT in an observation slot that exists before a start point of the FBE frame (namely, the FBE frame #2) in which no SSB exists. If the LBT succeeds, the terminal device may serve as an initiating device and send a random access signal on the RACH resource located at the frame header of the FBE frame.

It should be understood that the FBE frame #1 shown in FIG. 7 may correspond to the third FBE frame, and the FBE frame #2 corresponds to the fourth FBE frame.

In addition, the FBE frame #1 shown in FIG. 7 is an FBE frame in which an SSB exists. A RACH resource may also be configured in the FBE frame in which an SSB exists. As shown in FIG. 7, the network device performs LBT in an observation slot that exists before the FBE frame #1. If the LBT succeeds, the RACH resource is indicated to the UE in the RMSI. Other accompanying drawings in the following are similar, and details are not described again.

Solution 2

The network device configures a RACH resource in a COT of the FBE frame in which no SSB exists.

For the terminal device, the terminal device monitors a downlink signal in a frame header of a fifth FBE frame of the network device. When the terminal device detects the downlink signal in the frame header of the fifth FBE frame, the terminal device sends the random access signal on a RACH resource of the fifth FBE frame.

Herein, the fifth FBE frame is any one of FBE frames on the network side and in which no SSB exists. In the solution 2, the RACH resource is configured at a non-frame header location in the COT of the FBE frame on the network side and in which no SSB exists.

Figure 8:
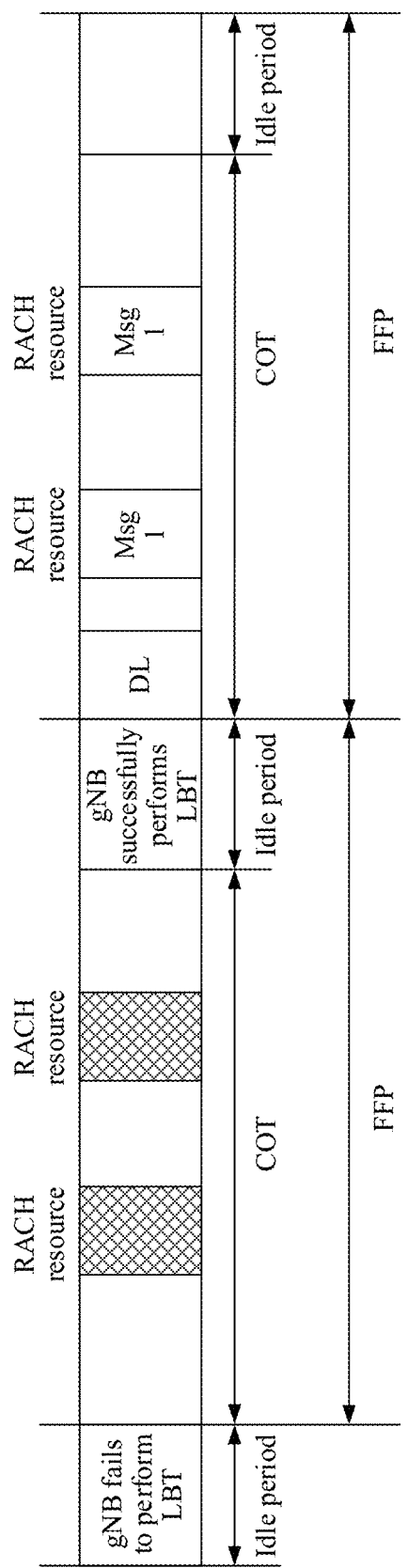
FIG. 8 is a schematic diagram of configuring a RACH resource in an FBE frame in which no SSB exists.

FIG. 8 is a schematic diagram of configuring a RACH resource in an FBE frame in which no SSB exists. The terminal device monitors, at a frame header location of the FBE frame in which no SSB exists, whether there is a downlink signal from the network device. If the terminal device detects the downlink signal, it indicates that the FBE frame is initiated by the network device. In this case, as a responding device, the terminal device may send a Msg 1 on a RACH resource of the FBE frame.

Solution 3

The network device dynamically indicates the RACH resource by using DCI in the FBE frame in which no SSB exists.

Figure 9:
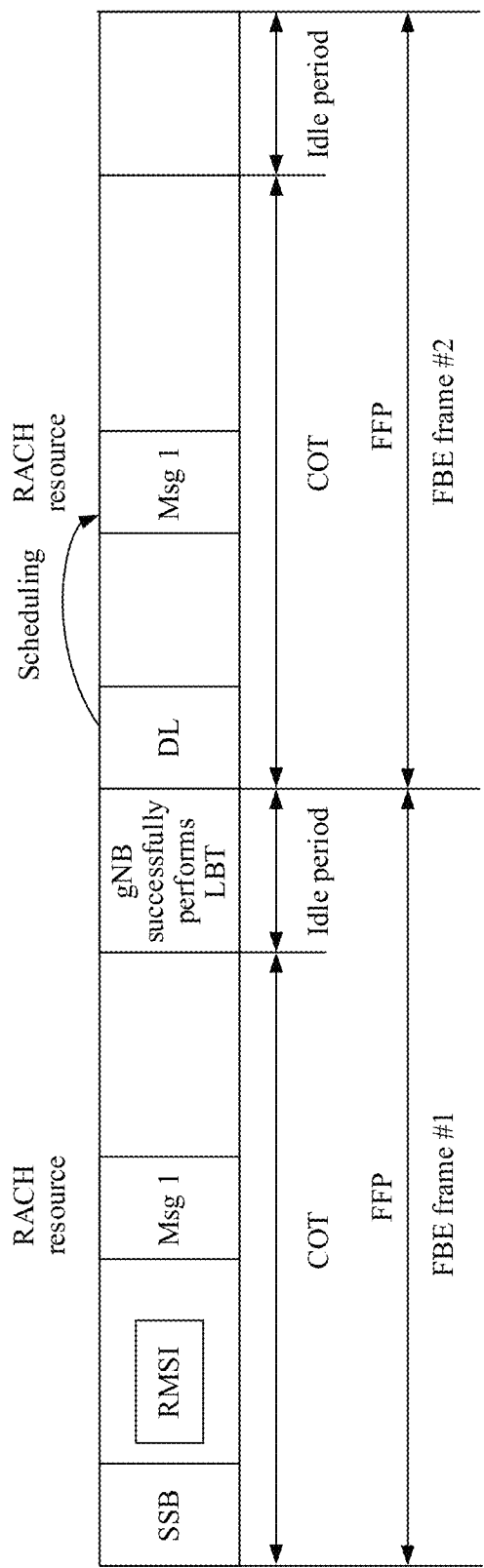
FIG. 9 is a schematic diagram in which a network device dynamically indicates a RACH resource by using DCI.

FIG. 9 is a schematic diagram in which a network device dynamically indicates a RACH resource by using DCI. The network device performs LBT in an observation slot that exists before a start point of an FBE frame (e.g., the FBE frame #2 shown in FIG. 9) on the network side and in which no SSB exists. If the LBT succeeds, the network device serves as an initiating device and sends DCI (DL shown in FIG. 9, indicating that the DL is used for downlink transmission) at a frame header location of the FBE frame #2, where the DCI is used to indicate a location of a RACH resource that is in the FBE frame #2 to the terminal device.

The foregoing describes how to configure the RACH resource in the FBE frame in which no SSB exists. The following describes how the terminal device receives the Msg 2.

According to the 4-step random access procedure described in FIG. 3, after the terminal device sends the Msg 1 on the RACH resource, the terminal device receives, in an RAR window configured by the network device, the Msg 2 sent by the network device.

However, according to various Msg 1 sending solutions described above, it may be found that limited by a sending location of the Msg 1 and period of the FFP, the RAR window may fall within one FBE frame, and may fall within two or more FBE frames (that is, the RAR window crosses FBE frames).

Figure 10:
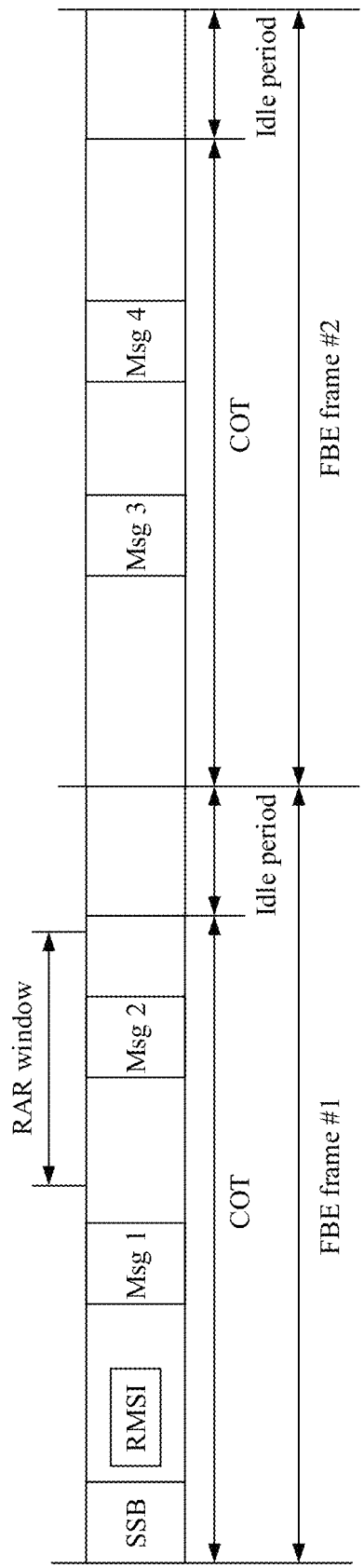
FIG. 10 is a schematic diagram in which an RAR window falls within one FBE frame.

FIG. 10 is a schematic diagram in which an RAR window falls within one FBE frame. As shown in FIG. 10, the RAR window may completely fall within a COT of one FBE frame. For example, the RAR window falls within a COT of the FBE frame #1.

Figure 11:
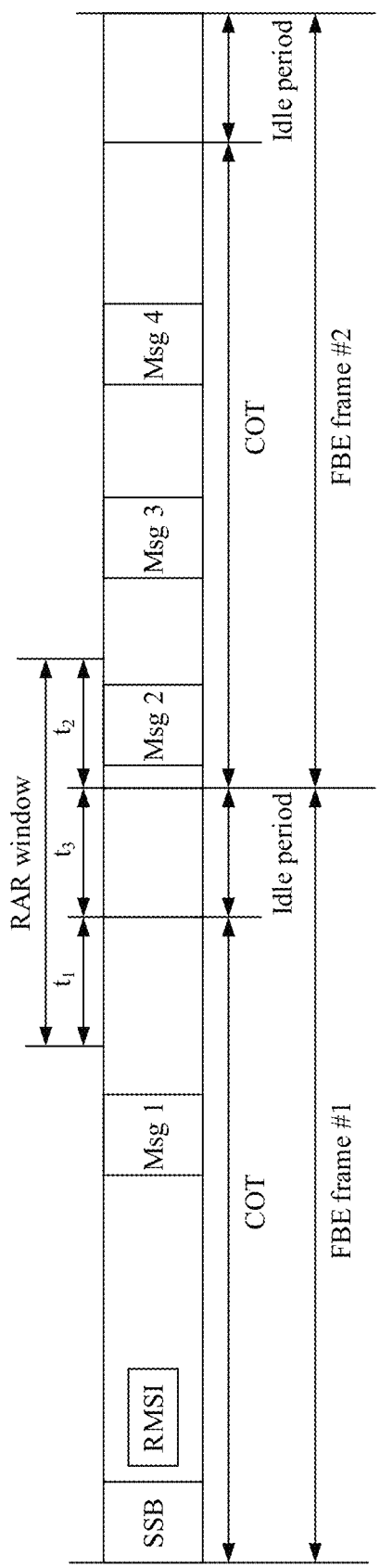
FIG. 11 is a schematic diagram of an RAR window crossing FBE frames.

FIG. 11 is a schematic diagram of an RAR window crossing FBE frames. In the foregoing example, the terminal device sends the random access signal on the RACH resource of the fifth FBE frame. After the terminal device sends the random access signal on the RACH resource of the fifth FBE frame, the terminal device monitors a random access response within a random access response window.

The random access response window may be located in the fifth FBE frame, or may be located in an FBE frame that exists after the fifth FBE frame. It is assumed in the following that the random access response window falls within an FBE frame that exists after the fifth FBE frame, and an FBE frame in which a start location of the random access response window is located is referred to as a sixth FBE frame. When the random access response window overlaps an idle period of the sixth FBE frame, the terminal device monitors the random access response in a first time period and a second time period of the random access response window, and skips monitoring the random access response within an overlapping part of the random access response window and the idle period of the sixth FBE frame. The first time period is located in the sixth FBE frame, the second time period is located in a seventh FBE frame, a sum of duration of the first time period and the second time period is equal to a period of the random access response window, and the seventh FBE frame is located after the sixth FBE frame and is adjacent to the sixth FBE frame.

For example, in FIG. 11, the RAR window may overlap an idle period of the FBE frame #1. To ensure that the period of the RAR window is not affected, the period of the RAR window needs to be extended to the FBE frame #2. As shown in FIG. 11, it is assumed that the terminal device sends a Msg 1 on a RACH resource of the FBE frame #1, and a start location of the RAR window is in the FBE frame #1. The terminal device starts to monitor the random access response within the RAR window. $t_1$ is located in the COT of the FBE frame #1, $t_3$ overlaps the idle period of the FBE frame #1, and $t_2$ is located in the COT of the FBE frame #2. The terminal device monitors the random access response within $t_1$. If the terminal device does not detect the random access response within $t_1$, when entering $t_3$, the terminal device suspends monitoring the random access response. When entering the COT of the FBE frame #2, the terminal device continues to monitor the random access response. In this way, it can be ensured that the period of the RAR window is not shortened because the RAR window overlaps the idle period of the FBE frame #1.

It should be understood that the FBE frame #1 in FIG. 11 may correspond to the sixth FBE frame, and the FBE frame #2 may correspond to the seventh FBE frame. $t_1$ corresponds to the first time period, and $t_2$ corresponds to the second time period.

The following describes a sending solution of the Msg 3.

After detecting the Msg 2 within the RAR window, the UE sends the Msg 3 on a resource location that is indicated in the Msg 2 and that is used to send the Msg 3.

According to a regulation of the FBE, an initiating device of one FBE frame can schedule a responding device only in the FBE frame, and cannot schedule the responding device across FBE frames. However, limited by a sending location of the Msg 2 and the period of the FFP, a resource location of the Msg 3 may appear in a next FBE frame. Therefore, a time-domain location of the Msg 3 needs to be scheduled based on different situations.

Figure 12:
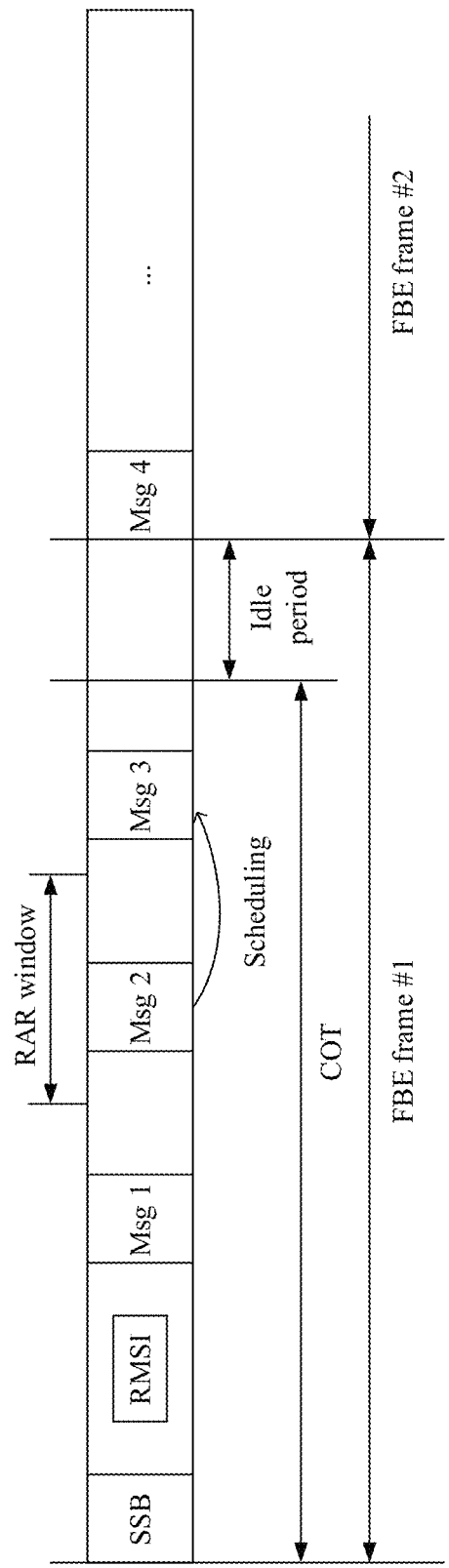
FIG. 12 is a schematic diagram of scheduling a Msg 3 by a network device.

In a possible case, FIG. 12 is a schematic diagram of scheduling a Msg 3 by a network device. As shown in FIG. 12, if the Msg 3 and the Msg 2 are located in a same FBE frame, the resource location of the Msg 3 is indicated by the Msg 2.

Figure 13:
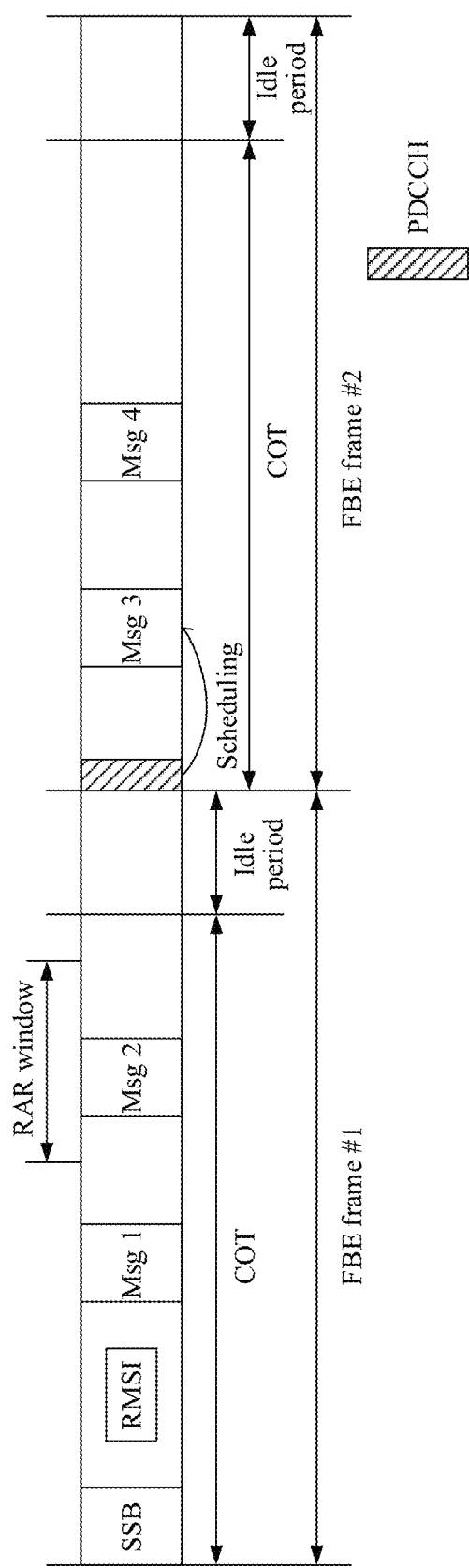
FIG. 13 is another schematic diagram of scheduling a Msg 3 by a network device.

In another possible case, FIG. 13 is another schematic diagram of scheduling a Msg 3 by a network device. If the Msg 3 and the Msg 2 are located in different FBE frames, or the Msg 3 is not located in an FBE frame in which the Msg 2 is located, the network device reschedules the Msg 3 by using the DCI. As shown in FIG. 13, the Msg 2 is located in the FBE frame #1. If the resource location of the Msg 3 is in the FBE frame #2, the network device needs to perform LBT in an observation slot that exists before the FBE frame #2, and after the LBT succeeds, the Msg 3 is scheduled in the FBE frame #2 by using the DCI. It should be understood that the DCI is carried on a PDCCH shown in FIG. 13.

In the two possible cases, the network device needs to indicate, to the terminal device in the Msg 2, a specific scheduling manner to be used, so that the UE correctly sends the Msg 3. For example, the network device explicitly indicates a resource location of the Msg 3 by using the Msg 2, for example, carries a frame number, a slot number, or a symbol index of the resource location of the Msg 3. Alternatively, the network device indicates, by using the Msg 2, the terminal device to receive, in a subsequent FBE frame, information indicating the resource location of the Msg 3.

In addition, according to the foregoing description, the initiating device of the FBE frame may share the current COT with a plurality of responding devices.

In an embodiment, all initiating devices in the COT of the FBE frame are gNBs. The UE performs uplink transmission in the current COT based on the scheduling of the gNB.

Figure 14:
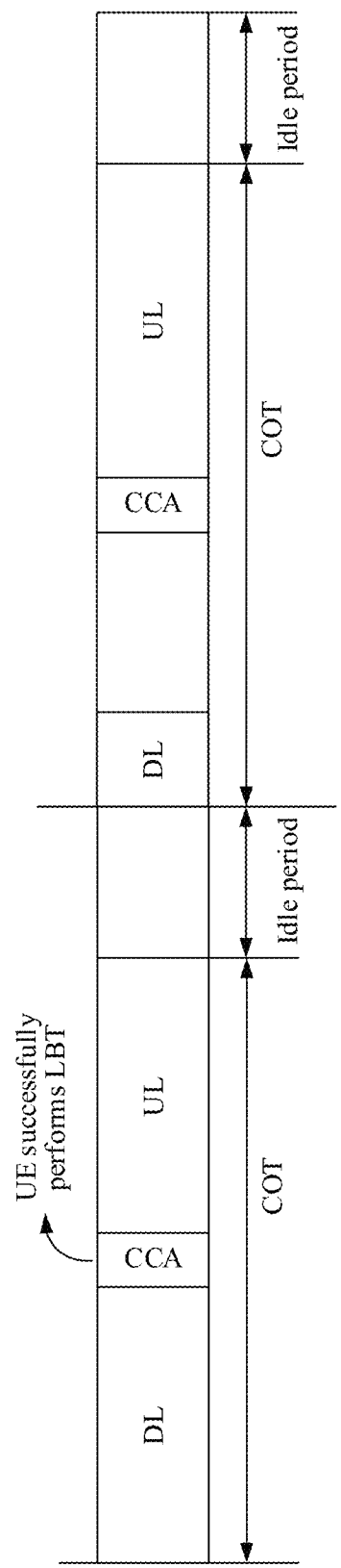
FIG. 14 is a schematic diagram in which COTs are all initiated by a network device.

FIG. 14 is a schematic diagram in which COTs are all initiated by a network device. It may be understood that, if COTs of FBE frames are all initiated by the network device, the UE serves as a responding device, and signal sending and receiving of the UE are both based on configuration of the FBE frame the network side. It may also be considered that the periodicity of the FBE frame on the UE side, the period of the FFP, and the rates of the COT and the idle period are completely consistent with the configuration of the FBE frame on the network side. When COT initiation of the FBE frame is in the configuration of the network device, sending an uplink signal (corresponding to UL shown in FIG. 13) by the terminal device needs to be based on scheduling of the network device. In addition, when a gap between a downlink signal sent by the network device and an uplink signal sent by the terminal device is greater than 16 μs, the terminal device needs to perform CAA detection again.

In another embodiment, the COT of the FBE frame may be initiated by the network device, or may be initiated by the terminal device. In other words, both the gNB initiated COT and the UE initiated COT exist.

Figure 15:
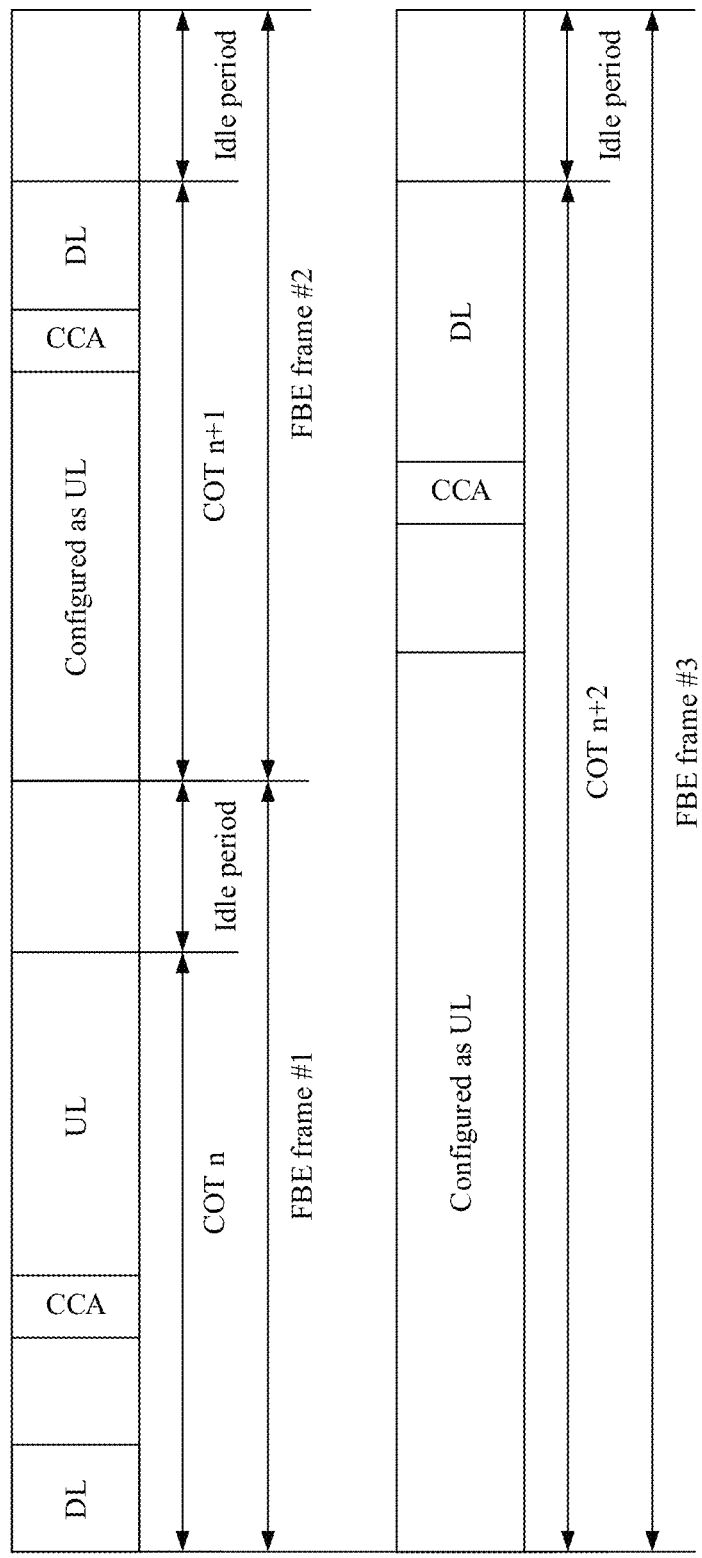
FIG. 15 is a schematic diagram in which a COT may be initiated by a network device or a terminal device.

FIG. 15 is a schematic diagram in which a COT may be initiated by a network device or a terminal device. As shown in FIG. 15, if the COT of the FBE frame may be initiated by the network device, for example, the COT may be a COT n, or may be initiated by the UE, for example, the COT may be a COT n+1 or a COT n+2.

For the UE, the UE receives the downlink signal based on the configuration of the FBE frame on the network side, and sends the uplink signal based on the configuration of the FBE frame on the terminal side. In this embodiment, a resource location (a location that is shown in FIG. 15 and that is configured as UL) at which the terminal device sends the uplink signal may be configured by the network side. For example, the network device statically configures the resource location used by the terminal device to send the uplink signal. For another example, the network device dynamically configures the resource location used by the terminal device to send the uplink signal. In dynamic configuration, after successfully performing the LBT, the network device indicates, to the UE by using downlink information in an FBE frame that obtains a use right, a resource location for sending an uplink signal in a current frame. Regardless of whether static configuration or dynamic configuration is used, the terminal device needs to sense a channel before the resource locations that are configured by the network device and that are used to send the uplink signal. If the channel sensing succeeds, the uplink signal may be sent at these resource locations.

The foregoing describes in detail the random access method provided in this application. The following describes a random access apparatus provided in this application.

Figure 16:
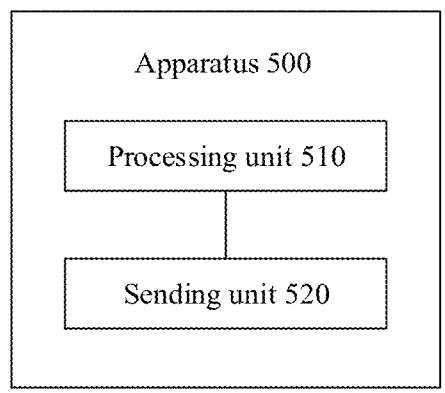
FIG. 16 is a schematic block diagram of a random access apparatus 500 according to this application.

FIG. 16 is a schematic block diagram of a random access apparatus 500 according to this application. As shown in FIG. 16, the apparatus 500 includes a processing unit 510 and a transceiver unit 520.

The processing unit 510 is configured to determine a first channel access type used by a terminal device to access a first unlicensed frequency band, where the first channel access type is one of channel access types of an unlicensed frequency band, and there are two channel access types of the unlicensed frequency band: FBE and load based equipment LBE.

The transceiver unit 520 is configured to send a first system message to the terminal device. The first system message carries first indication information, and the first indication information is used to indicate the first channel access type.

In an embodiment, the processing unit 510 is specifically configured to sense a channel within an idle period of a first FBE frame. The transceiver unit 520 is specifically configured to: when the processing unit 510 determines that a channel state is idle, send the first system message in a second FBE frame, where the first system message carries the first indication information, the first indication information is used to indicate that the first channel access type is FBE, and the second FBE frame is adjacent to the first FBE frame and is located after the first FBE frame.

In another embodiment, the transceiver unit 520 is further configured to send first radio resource control RRC signaling to the terminal device, where the first RRC signaling carries configuration information of an FBE frame of the terminal device, the configuration information of the FBE frame of the terminal device includes a period of a fixed frame period FFP of the FBE frame of the terminal device, and the period of the FBE frame of the terminal device is n times a period of an FBE frame of a network device, where n>1, and n is an integer.

In another embodiment, the transceiver unit 520 is further configured to:
send fourth indication information to the terminal device, where the fourth indication information is used to indicate an effective remaining time of the first channel access type, and the first channel access type likely changes after the effective remaining time; and
send a second system message to the terminal device after the effective remaining time, where the second system message is used to indicate a channel access type that exists after the effective remaining time.

In another embodiment, the transceiver unit 520 is further configured to send second RRC signaling to the terminal device, where the second RRC signaling carries configuration information of an FBE frame of at least one second unlicensed frequency band other than a first unlicensed frequency band, and the at least one second unlicensed frequency band does not overlap the first unlicensed frequency band.

Optionally, the apparatus 500 may be a chip or an integrated circuit.

Optionally, the processing unit 510 may be a processor.

Optionally, the transceiver unit 520 may be a transceiver, and the transceiver may include a transmitter and a receiver, and have both receiving and sending functions.

Optionally, the transceiver unit 520 may further be an input/output interface or an input/output circuit.

Optionally, the transceiver unit 520 may be a communications interface, for example, an input/output interface circuit, an input interface circuit, and an output interface circuit.

The apparatus 500 may correspond to the network device in the random access method embodiment provided in this application. Units included in the apparatus 500 are respectively configured to implement corresponding operations and/or procedures performed by the network device in the method embodiments.

For example, the processing unit 510 is configured to perform operations and/or steps implemented inside the terminal device in the method embodiments. For example, the processing unit 510 is configured to: determine the first channel access type used by the terminal device to perform random access, sense a channel, determine whether a channel state is idle, and the like.

The transceiver unit 520 is configured to: send the first system message, the second system message, the fourth indication information, the first RRC signaling, and the second RRC signaling to the terminal device, monitor the random access response, and the like.

Figure 17:
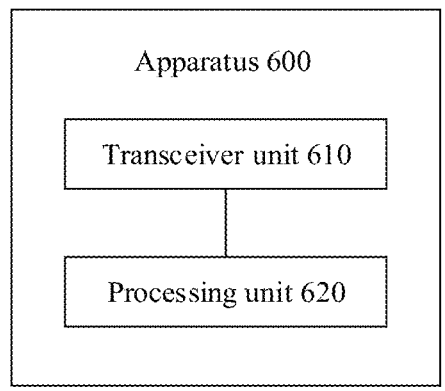
FIG. 17 is a schematic block diagram of a random access apparatus 600 according to this application.

FIG. 17 is a schematic block diagram of a random access apparatus 600 according to this application. As shown in FIG. 17, the apparatus 600 includes a processing unit 620 and a transceiver unit 610.

The transceiver unit 610 is configured to receive a first system message from a second FBE frame of a network device, where the first system message carries first indication information, the first indication information is used to indicate a first channel access type, the first channel access type is one of channel access types of an unlicensed frequency band, and there are two channel access types of the unlicensed frequency band: FBE and LBE.

The processing unit 620 is configured to access the first unlicensed frequency band by using the first channel access type.

In an embodiment, the transceiver unit 610 is specifically configured to receive the first system message in the second FBE frame on a network side, where the first system message carries the first indication information, and the first indication information is specifically used to indicate that the first channel access type is FBE.

In another embodiment, the processing unit 620 is further configured to determine a boundary of a radio frame based on an offset of a boundary of an FBE frame of the network device relative to the boundary of the radio frame and the boundary of the FBE frame.

In another embodiment, the transceiver unit 610 is further configured to receive first radio resource control RRC signaling from the network device, where the first RRC signaling carries configuration information of an FBE frame of the apparatus, the configuration information includes a period of a fixed frame period FFP of the FBE frame of the apparatus, and the period of the FFP of the FBE frame of the apparatus is n times a period of an FFP of the FBE frame of the network device, where n>1, and n is an integer. The processing unit 620 is further configured to determine configuration of an FBE frame of a terminal device based on the first system message and the first RRC signaling.

In another embodiment, the processing unit 620 is further configured to sense a channel within an idle period of a third FBE frame. The transceiver unit 610 is further configured to: when the processing unit 620 determines that a channel state is idle, send a random access signal on a RACH resource at a frame header location of a fourth FBE frame, where no SSB exists in the fourth FBE frame, and the fourth FBE frame is located after the third FBE frame and is adjacent to the third FBE frame.

In another embodiment, the transceiver unit 610 is further configured to monitor a downlink signal in a frame header of a fifth FBE frame of the network device. The transceiver unit 610 is further configured to: when detecting the downlink signal in the frame header of the fifth FBE frame, send a random access signal on a RACH resource of the fifth FBE frame.

In another embodiment, the transceiver unit 610 is further configured to monitor a random access response within a random access response window. When the random access response window overlaps an idle period of a sixth FBE frame, the transceiver unit 610 monitors the random access response in a first time period and a second time period of the random access response window, and skips monitoring the random access response within an overlapping part of the random access response window and the idle period of the sixth frame, where the first time period is located in the sixth FBE frame, and the second time period is located in a seventh FBE frame. A sum of duration of the first time period and the second time period is equal to period of the random access response window, the sixth FBE frame and the fifth FBE frame are a same FBE frame or the sixth FBE frame is located after the fifth FBE frame, and the seventh FBE frame is located after the sixth FBE frame.

In another embodiment, the transceiver unit 610 is further configured to receive fourth indication information from the network device, where the fourth indication information is used to indicate an effective remaining time of the first channel access type, and the first channel access type likely changes after the effective remaining time. The transceiver unit 610 is further configured to receive a second system message from the network device after the effective remaining time. The processing unit 620 is further configured to determine, based on an indication of the second system message, a channel access type that exists after the effective remaining time.

In another embodiment, the transceiver unit 610 is further configured to receive second RRC signaling from the network device, where the second RRC signaling carries configuration information of an FBE frame of at least one second unlicensed frequency band other than a first unlicensed frequency band, and the at least one second unlicensed frequency band is different from the first unlicensed frequency band.

Optionally, the apparatus 600 may be a chip or an integrated circuit.

Optionally, the transceiver unit 610 may be a transceiver, and the transceiver may include a transmitter and a receiver, and have both receiving and sending functions.

Optionally, the transceiver unit 610 may further be an input/output interface or an input/output circuit.

Optionally, the transceiver unit 610 may be a communications interface, for example, an input/output interface circuit, an input interface circuit, and an output interface circuit.

Optionally, the processing unit 620 may be a processor.

The apparatus 600 may correspond to the network device in the random access method embodiment provided in this application. Units included in the apparatus 600 are respectively configured to implement corresponding operations and/or procedures performed by the network device in the method embodiments.

The transceiver unit 610 is configured to perform the step of receiving a message and/or information from the network device in the method embodiments. For example, the transceiver unit 610 is configured to: receive the first system message, the second system message, the fourth indication information, the first RRC signaling, and the second RRC signaling from the network device, monitor the random access response, and the like.

The processing unit 620 is configured to perform operations and/or steps implemented inside the terminal device in the method embodiments. For example, the processing unit 620 is configured to determine the first channel access type and related configuration information of an FBE frame on a network side based on the first system message, for example, a period of an FFP, and rates of a COT and an idle period. The processing unit 620 is further configured to: determine a boundary of a radio frame, determine configuration information of an FBE frame of the apparatus, for example, a period of an FFP of the FBE frame of the apparatus and an offset relative to the FBE frame on the network side, and determine the effective remaining time of the first channel access type.

The chip in this embodiment of this application may be a field-programmable gate array (FPGA), an application-specific integrated chip (ASIC), a system on chip (SoC), a central processing unit (CPU), a network processor (NP), a digital signal processor (DSP), or may be a microcontroller unit (micro controller unit, MCU), a programmable logic device (PLD), or another integrated chip.

This application further provides a network device 1000. The following provides descriptions with reference to FIG. 18.

Figure 18:
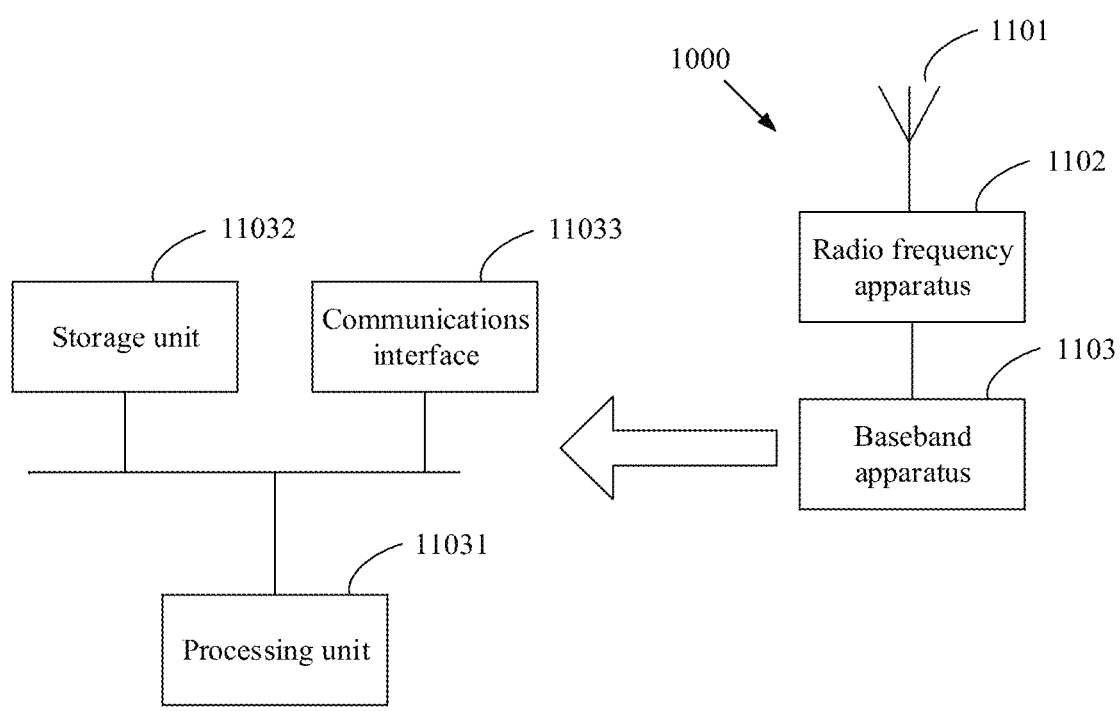
FIG. 18 is a schematic structural diagram of a network device 1000 according to an embodiment of this application.

FIG. 18 is a schematic structural diagram of a network device 1000 according to this application. The network device 1000 is configured to implement functions of the network device in the method embodiments. As shown in FIG. 18, the network device 1000 includes an antenna 1101, a radio frequency apparatus 1102, and a baseband apparatus 1103. The antenna 1101 is connected to the radio frequency apparatus 1102. In an uplink direction, the radio frequency apparatus 1102 receives, through the antenna 1101, a signal sent by a terminal device, and sends, to the baseband apparatus 1103, the signal sent by the terminal device for processing. In a downlink direction, the baseband apparatus 1103 processes a signal that needs to be sent to the terminal device, and sends the signal to the radio frequency apparatus 1102. The radio frequency apparatus 1102 transmits the signal through the antenna 1101.

The baseband apparatus 1103 may include one or more processing units 11031. In addition, the baseband apparatus 1103 may further include a storage unit 11032 and a communications interface 11033. The storage unit 11032 is configured to store a program and data. The communications interface 11033 is configured to exchange information with the radio frequency apparatus 1102. The communications interface 11033 may be an input/output interface or an input/output circuit.

The network device 1000 in the foregoing apparatus embodiment may completely correspond to the network device in the method embodiment, and a corresponding unit included in the network device 1000 is configured to perform a corresponding step performed by the network device in the method embodiment.

For example, the baseband apparatus 1103 is configured to perform an operation and/or a step that are/is implemented inside the network device. For example, the baseband apparatus 1103 is configured to: determine a first channel access type used by the terminal device to access a first unlicensed frequency band, determine whether a channel state is idle, and determine configuration of an FBE frame on a network side and configuration of an FBE frame on a terminal side.

For another example, the radio frequency apparatus 1102 exchanges a message and/or information with the terminal device through the antenna 1101. For example, the radio frequency apparatus 1102 sends a first system message, a second system message, fourth indication information, first RRC signaling, second RRC signaling, a random access response, and the like to the terminal device.

Figure 19:
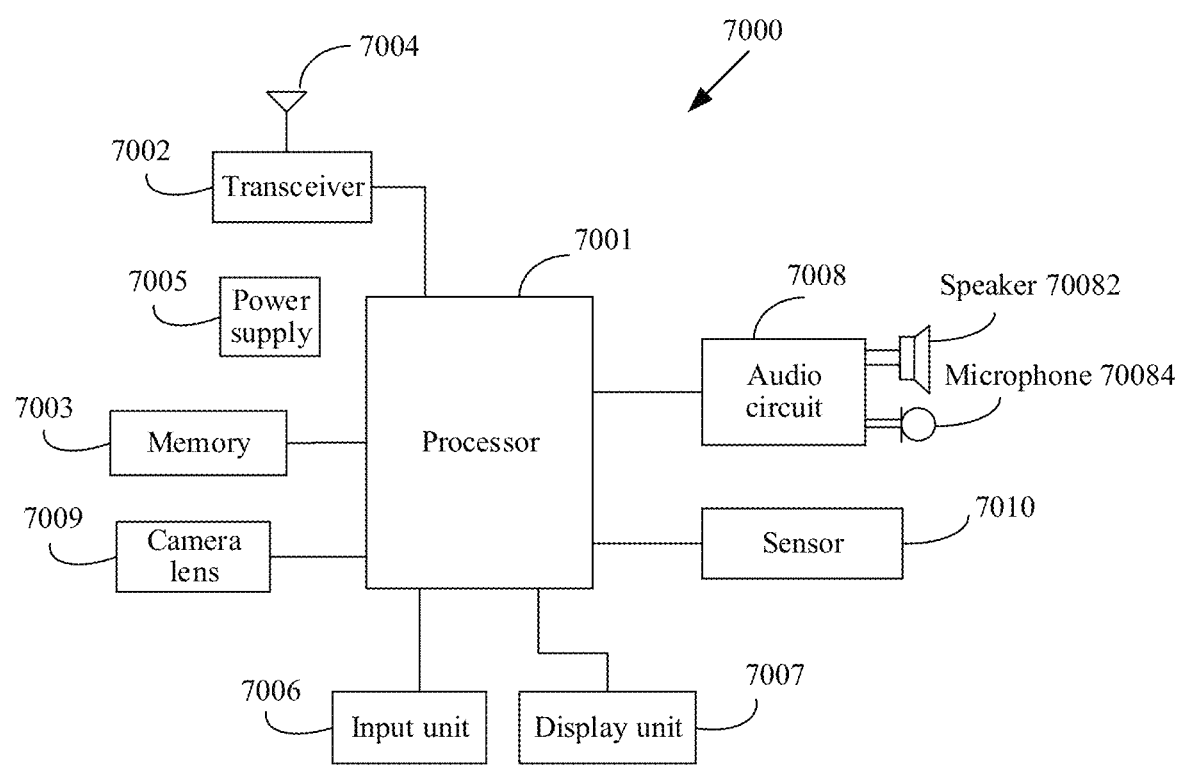
FIG. 19 shows a terminal device 7000 according to this application.

FIG. 19 shows a terminal device 7000 according to this application. As shown in FIG. 19, the terminal device 7000 includes a processor 7001 and a transceiver 7002. Optionally, the terminal device 7000 further includes a memory 7003. The processor 7001, the transceiver 7002, and the memory 7003 may communicate with each other through an internal connection path, to transfer a control signal and/or a data signal. The memory 7003 is configured to store a computer program, and the processor 7001 is configured to invoke the computer program from the memory 7003 and run the computer program, to control the transceiver 7002 to receive and send a signal.

Optionally, the terminal device 7000 may further include an antenna 7004, configured to send, through a radio signal, information or data output by the transceiver 7002.

The processor 7001 and the memory 7003 may be integrated into one processing apparatus. The processor 7001 is configured to execute program code stored in the memory 7003 to implement the foregoing functions. During specific implementation, the memory 7003 may also be integrated into the processor 7001, or may be independent of the processor 7001.

The processor 7001 may be configured to perform an action that is implemented inside the terminal device and that is described in the foregoing method embodiments, and the transceiver 7002 may be configured to perform a receiving or sending action performed by the terminal device.

For example, the transceiver 7002 performs the step of receiving a message and/or information from the network device in the method embodiments. For example, the transceiver 7002 receives a first system message, a second system message, fourth indication information, first RRC signaling, and second RRC signaling from the network device, monitors a random access response, and the like. For another example, the processor 7001 determines a first channel access type and related configuration information of an FBE frame on a network side based on the first system message, for example, a period of an FFP, and rates of a COT and an idle period. The processor 7001 is further configured to: determine a boundary of a radio frame, determine configuration information of an FBE frame on a terminal side, for example, a period of an FFP of the FBE frame on the terminal side and an offset relative to the FBE frame on the network side, and determine an effective remaining time of the first channel access type.

Optionally, the terminal device 7000 may further include a power supply 7005, configured to supply power to various devices or circuits in the terminal device.

In addition, to improve functions of the terminal device, the terminal device 7000 may further include one or more of an input unit 7006, a display unit 7007, an audio circuit 7008, a camera lens 7009, a sensor 7010, and the like. The audio circuit may further include a loudspeaker 70082, a microphone 70084, and the like.

In addition, this application provides a computer-readable storage medium. The computer-readable storage medium stores a computer instruction. When the computer instruction is run on a computer, the computer is enabled to perform a corresponding operation and/or procedure performed by the network device in the method embodiments.

This application provides a computer-readable storage medium. The computer-readable storage medium stores a computer instruction. When the computer instruction is run on a computer, the computer is enabled to perform a corresponding operation and/or procedure performed by the terminal device in the method embodiments.

This application further provides a computer program product. The computer program product includes computer program code. When the computer program code is run on a computer, the computer is enabled to perform a corresponding operation and/or procedure performed by the network device in the random access method provided in this application.

This application further provides a computer program product. The computer program product includes computer program code. When the computer program code is run on a computer, the computer is enabled to perform a corresponding operation and/or procedure performed by the terminal device in the random access method provided in this application.

This application further provides a chip, including a processor. The processor is configured to invoke and run a computer program stored in a memory, to perform a corresponding operation and/or procedure performed by the network device in the random access method provided in this application.

Optionally, the chip further includes a memory, and the memory is connected to the processor. The processor is configured to read and execute the computer program in the memory.

Further, optionally, the chip includes a communications interface. The processor is connected to the communications interface. The communications interface is configured to receive a signal and/or data that need/needs to be processed. The processor obtains the signal and/or data from the communications interface, and processes the signal and/or data.

This application further provides a chip, including a processor. The processor is configured to invoke and run a computer program stored in a memory, to perform a corresponding operation and/or procedure performed by the terminal device in the random access method provided in this application.

Optionally, the chip further includes a memory, and the memory is connected to the processor. The processor is configured to read and execute the computer program in the memory.

Further, optionally, the chip includes a communications interface. The processor is connected to the communications interface. The communications interface is configured to receive a signal and/or data that need/needs to be processed. The processor obtains the signal and/or data from the communications interface, and processes the signal and/or data.

Optionally, the communications interface in the foregoing embodiment may be an input/output interface, and may specifically include an input interface and an output interface. Alternatively, the communications interface may be an input/output circuit, and may specifically include an input circuit and an output circuit.

The memory and the processor in the foregoing embodiments may be physically independent units, or the memory may be integrated with the processor.

In the foregoing embodiments, the processor may be a central processing unit (CPU), a microprocessor, an application-specific integrated circuit (ASIC), one or more integrated circuits for controlling program execution in the technical solutions of this application, or the like. For example, the processor may be a digital signal processor device, a microprocessor device, an analog-to-digital converter, and a digital-to-analog converter. The processor may allocate control and signal processing functions of the terminal device or the network device between these devices based on respective functions of these devices. In addition, the processor may have a function of operating one or more software programs. The software programs may be stored in a memory. The function of the processor may be implemented by hardware, or may be implemented by hardware by executing corresponding software. The hardware or the software includes one or more modules corresponding to the foregoing function.

The memory may be a read-only memory (ROM), another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in an instruction or data structure form and that can be accessed by a computer.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the part contributing to the conventional technology in the technical solutions of this application or some of the technical solutions may be implemented in a form of a software product. The software product is stored in a storage medium, and includes several instructions for instructing a computer device (which may be a personal computer, a server, or a network device) to perform all or some of the steps of the method described in the embodiments of this application. The storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application, and the protection scope of this application shall be subject to the protection scope of the claims.

What is claimed is:

1. A random access method carried out by a network device, applied to an unlicensed frequency band, wherein the method comprises:
    obtaining a duration of a frame period of a frame based equipment (FBE) frame of a terminal device according to a constraint that the frame period of the FBE frame of the terminal device must be an integer multiple, of at least 2, of a duration of a frame period of the network device;
    generating, a first system message;
    sending, to the terminal device, the first system message that carries first indication information used to indicate a first channel access type that is a FBE type; and
    sending, to the terminal device, first radio resource control (RRC) signaling that carries configuration information of the FBE frame of the terminal device,
    wherein the configuration information comprises the duration of the frame period of the FBE frame of the terminal device.

2. The method according to claim 1, wherein the first system message is carried in a physical broadcast channel (PBCH) or remaining minimum system information (RMSI).

3. The method according to claim 2, wherein the first system message further comprises second indication information, and the second indication information is used to indicate a periodicity of a frame of the network device.

4. The method according to claim 2, wherein the first system message further comprises third indication information that is used to indicate rates of a channel occupancy time (COT) and an idle period of the frame of the network device.

5. The method according to claim 2, wherein the first system message further comprises an offset of a boundary of the frame of the network device relative to a boundary of the radio frame.

6. The method according to claim 1, wherein the first RRC signaling further carries an offset of a boundary of the frame of the terminal device relative to the boundary of the frame of the network device.

7. The method according to claim 1, wherein the method further comprises:
sending fourth indication information to the terminal device that is used to indicate an effective remaining time of the first channel access type; and
sending a second system message to the terminal device after the effective remaining time, wherein the second system message is used to indicate a channel access type that exists after the effective remaining time.

8. The method according to claim 1, wherein the method further comprises:
sending second radio resource control (RRC) signaling to the terminal device, wherein the second RRC signaling carries configuration information of a frame of at least one second unlicensed frequency band other than a first unlicensed frequency band, and
wherein the at least one second unlicensed frequency band does not overlap the first unlicensed frequency band.

9. A random access method carried out by a terminal device, wherein the method comprises:
obtaining, from a network device, a first system message that carries first indication information used to indicate a first channel access type used by the terminal device to access a first unlicensed frequency band, and wherein the first channel access type is a frame based equipment (FBE) type;
receiving, from the network device, first radio resource control (RRC) signaling that carries configuration information of a FBE frame of the terminal device, wherein the configuration information comprises a duration of a frame period of the FBE frame of the terminal device, wherein the duration of the frame period of the FBE frame of the terminal device is constrained to be an integer multiple, of at least 2, of a duration of a frame period of the network device;
determining configuration of the FBE frame of the terminal device based on the first system message and the first RRC signaling; and
accessing the first unlicensed frequency band by using the first channel access type.

10. The method according to claim 9, wherein the first system message is carried in a physical broadcast channel (PBCH) or remaining minimum system information (RMSI).

11. The method according to claim 10, wherein the first system message further comprises second indication information, and the second indication information is used to indicate a periodicity of a frame of the network device.

12. The method according to claim 10, wherein the first system message further comprises third indication information that is used to indicate rates of a channel occupancy time (COT) and an idle period of the frame of the network device.

13. The method according to claim 11, wherein the first RRC signaling further carries an offset of the frame of the terminal device relative to the frame of the network device.

14. The method according to claim 10, wherein the first system message carries information used to indicate a random access channel (RACH) resource, wherein the first system message is carried in a synchronization signal block (SSB), and the method further comprises:
sensing a channel within an idle period of a third frame; and
sending, in accordance with determining that a channel state is idle, a random access signal on a first RACH resource that is located at a frame header of a fourth frame,
wherein no SSB exists in the fourth frame, and
wherein the fourth frame is located after the third frame and is adjacent to the third frame.

15. The method according to claim 10, wherein the method further comprises:
monitoring a downlink signal in a frame header of a fifth frame of the network device; and
sending, in accordance with detecting the downlink signal in the frame header of the fifth frame, sending, by the terminal device, a random access signal on a random access channel (RACH) resource of the fifth frame.

16. The method according to claim 15, wherein after the sending a random access signal on a RACH resource of the fifth frame, the method further comprises:
monitoring a random access response within a random access response window; and
in accordance with the random access response window overlapping an idle period of a sixth frame, performing:
monitoring the random access response in a first time period and a second time period of the random access response window, and skipping monitoring the random access response within an overlapping part of the random access response window and the idle period of the sixth frame,
wherein the first time period is located in the sixth frame,
wherein the second time period is located in a seventh frame,
wherein a sum of duration of the first time period and the second time period is equal to a period of the random access response window,
wherein the sixth frame and the fifth frame are a same frame or the sixth frame is located after the fifth frame, and
wherein the seventh frame is located after the sixth frame.

17. The method according to claim 10, wherein after the accessing the first unlicensed frequency band by using the first channel access type, the method further comprises:
receiving fourth indication information from the network device, wherein the fourth indication information is used to indicate an effective remaining time of the first channel access type, and the first channel access type likely changes after the effective remaining time;
receiving a second system message from the network device after the effective remaining time; and
determining, based on an indication of the second system message, a channel access type that exists after the effective remaining time.

18. The method according to claim 10, wherein the method further comprises:
receiving second radio resource control (RRC) signaling from the network device, wherein the second RRC signaling carries configuration information of a frame of at least one second unlicensed frequency band other than a first unlicensed frequency band, and the at least one second unlicensed frequency band is different from the first unlicensed frequency band.

19. A network device comprising:
a processor; and a non-transitory computer-readable medium including computer-executable instructions that, when executed by the processor, cause the network device to carry out a random access method, applied to an unlicensed frequency band, wherein the method comprises:

obtaining a duration of a frame period of a frame based equipment (FBE) frame of a terminal device according to a constraint that the frame period of the FBE frame of the terminal device must be an integer multiple, of at least 2, of a duration of a frame period of the network device;

generating, a first system message;

sending, to the terminal device, the first system message that carries first indication information used to indicate a first channel access type that is a FBE type; and sending, to the terminal device, first radio resource control (RRC) signaling that carries configuration information of the FBE frame of the terminal device, wherein the configuration information comprises the duration of the frame period of the FBE frame of the terminal device.

20. A terminal device comprising:

a processor; and a non-transitory computer-readable medium including computer-executable instructions that, when executed by the processor, cause the terminal device to carry out a random access method, wherein the method comprises:

obtaining, from a network device, a first system message that carries first indication information used to indicate a first channel access type used by the terminal device to access a first unlicensed frequency band, and wherein the first channel access type is a frame based equipment (FBE) type;

receiving, from the network device, first radio resource control (RRC) signaling that carries configuration information of a FBE frame of the terminal device, wherein the configuration information comprises a duration of a frame period of the FBE frame of the terminal device, wherein the duration of the frame period of the FBE frame of the terminal device is constrained to be an integer multiple, of at least 2, of a duration of a frame period of the network device;

determining configuration of the FBE frame of the terminal device based on the first system message and the first RRC signaling; and accessing the first unlicensed frequency band by using the first channel access type.

* * * * *